(12) United States Patent
Boyer et al.

(10) Patent No.: US 12,209,398 B2
(45) Date of Patent: Jan. 28, 2025

(54) SMART SHOWER SENSOR

(71) Applicant: Delta Faucet Company, Indianapolis, IN (US)

(72) Inventors: Bradley E. Boyer, Tipton, IN (US); Joshua Drew Wales, Indianapolis, IN (US); Nathan Sickler, Westfield, IN (US); Kyle Robert Davidson, Noblesville, IN (US)

(73) Assignee: Delta Faucet Company, Indianapolis, IN (US)

( * ) Notice: Subject to any disclaimer, the term of this patent is extended or adjusted under 35 U.S.C. 154(b) by 440 days.

(21) Appl. No.: 17/514,689

(22) Filed: Oct. 29, 2021

(65) Prior Publication Data

US 2022/0136223 A1 May 5, 2022

Related U.S. Application Data

(60) Provisional application No. 63/107,192, filed on Oct. 29, 2020.

(51) Int. Cl.
| E03C 1/04 | (2006.01) |
| G16Y 20/10 | (2020.01) |
| G16Y 40/10 | (2020.01) |
| H04L 67/12 | (2022.01) |
| H04W 4/38 | (2018.01) |

(52) U.S. Cl.
CPC ............ *E03C 1/0408* (2013.01); *H04L 67/12* (2013.01); *H04W 4/38* (2018.02); *G16Y 20/10* (2020.01); *G16Y 40/10* (2020.01)

(58) Field of Classification Search
CPC .............. E03C 1/0408; E03C 1/041; E03C 2001/0418; E03C 1/021; E03C 1/023; E03C 1/057; H04L 67/12; H04L 67/306; H04L 67/55; H04W 4/38; H04W 4/70; G16Y 20/10; G16Y 40/10; G01D 21/02
See application file for complete search history.

(56) References Cited

U.S. PATENT DOCUMENTS

| 6,438,770 | B1 | 8/2002 | Hed et al. |
| 8,028,355 | B2 | 10/2011 | Reeder et al. |
| 8,162,236 | B2 | 4/2012 | Rodenbeck et al. |
| 8,408,517 | B2 | 4/2013 | Jonte et al. |
| 8,438,672 | B2 | 5/2013 | Reeder et al. |
| 8,614,414 | B2 | 12/2013 | Davidson et al. |
| 9,032,564 | B2 | 5/2015 | Reeder et al. |
| 9,285,807 | B2 | 3/2016 | Rodenbeck et al. |
| 9,470,336 | B2 | 10/2016 | Huffington et al. |
| 9,552,706 | B2 | 1/2017 | Schneider, II et al. |

(Continued)

FOREIGN PATENT DOCUMENTS

| CN | 103480515 A | 1/2014 |
| CN | 111820789 A | 10/2020 |

(Continued)

*Primary Examiner* — Christine J Skubinna
(74) *Attorney, Agent, or Firm* — Bose McKinney & Evans LLP

(57) ABSTRACT

A smart shower sensor configured to be fluidly coupled to a showerhead. The smart shower sensor is configured to provide notifications and/or transmit notifications to other smart devices based on, for example, water temperature and/or water usage.

29 Claims, 17 Drawing Sheets
(1 of 17 Drawing Sheet(s) Filed in Color)

(56) References Cited

U.S. PATENT DOCUMENTS

| | | |
|---|---|---|
| 9,632,514 B2 | 4/2017 | Marty et al. |
| 9,715,238 B2 | 7/2017 | Rodenbeck et al. |
| 9,988,797 B2 | 6/2018 | Reeder et al. |
| 10,102,721 B2 | 10/2018 | Schneider et al. |
| 10,480,165 B2 | 11/2019 | Reeder et al. |
| 10,633,842 B2 | 4/2020 | Tayenaka et al. |
| 10,698,429 B2 | 6/2020 | Rodenbeck et al. |
| 2002/0007510 A1 | 1/2002 | Mann |
| 2010/0127087 A1 | 5/2010 | Lin |
| 2010/0172218 A1 | 7/2010 | Orcutt et al. |
| 2011/0031331 A1 | 2/2011 | Klicpera |
| 2013/0075483 A1 | 3/2013 | Marty et al. |
| 2013/0239321 A1* | 9/2013 | Reeder .................... E03C 1/057 4/615 |
| 2013/0312856 A1 | 11/2013 | Huffington |
| 2016/0076231 A1* | 3/2016 | Goel .................... E03C 1/0408 700/283 |
| 2016/0129464 A1* | 5/2016 | Frommer ............. B05B 12/008 700/282 |
| 2016/0258144 A1* | 9/2016 | Tayenaka ................ G05D 27/02 |
| 2017/0050201 A1 | 2/2017 | Deivasigamani et al. |
| 2017/0350101 A1 | 12/2017 | Lee et al. |
| 2017/0350103 A1* | 12/2017 | Lee ......................... E03C 1/055 |
| 2018/0282984 A1 | 10/2018 | Reeder et al. |
| 2019/0366374 A1 | 12/2019 | Deivasigamani et al. |
| 2022/0007895 A1 | 1/2022 | Hernandez Vicente et al. |

FOREIGN PATENT DOCUMENTS

| | | |
|---|---|---|
| FR | 3085977 A1 | 3/2020 |
| WO | 2019079393 A1 | 4/2019 |

\* cited by examiner

Temperature Indicator

Status Indication During

SMART SHOWER SENSOR

CROSS-REFERENCE TO RELATED APPLICATION

The present application claims priority to U.S. Provisional Patent Application Ser. No. 63/107,192, filed Oct. 29, 2020, the disclosure of which is expressly incorporated herein by reference.

BACKGROUND AND SUMMARY OF THE DISCLOSURE

The present disclosure relates generally to a smart shower and, more particularly, to a smart shower sensor configured to provide notifications and/or transmit notifications to other smart devices based on, for example, water temperature and/or water consumption.

Conventional showerheads receive water from a water source and output the water via one or more jets. Prior to entering a shower, a person generally physically checks the temperature of the water by, for example, putting the person's hand in the water stream to determine the water temperature is suitable for taking a shower. Moreover, a person generally does not know how much water is used while showering.

It is with respect to these and other general considerations that illustrative embodiments have been described. Also, although relatively specific problems have been discussed, it should be understood that the embodiments should not be limited to solving the specific problems identified in the background.

Aspects of the present disclosure relate to a smart shower sensor. In illustrative examples, a smart shower sensor comprises an inlet receiver configured to couple to a water source and receive water from the water source. The smart shower sensor may also include a conduit fluidly coupled to the inlet receiver and configured to receive the water from the inlet receiver. In illustrative embodiments, the smart shower sensor may include at least one sensor configured to sense a temperature of the water and an indicator configured to emit a notification of the temperature, a duration of a shower, or a combination thereof. In certain illustrative embodiments, the smart shower sensor includes a processor configured to: receive, from the at least one sensor, a temperature signal corresponding to the temperature; determine the duration; and send, to the indicator, a notification signal corresponding to: the temperature signal, a duration signal corresponding to the duration, or a combination thereof, wherein the indicator emits a notification of the temperature, the duration, or combination thereof in response to receiving the notification signal.

In illustrative examples, a system for monitoring shower usage, comprises: a processor; and memory storing instructions that, when executed by the processor, causes the system to perform a set of operations. The set of operations may include receiving, from at least one smart shower sensor, a temperature signal corresponding to a temperature of water passing through the smart shower sensor, a duration signal corresponding to a duration of a shower, or a combination thereof. In illustrative embodiments, the set of operations may also include outputting, via a display device, the temperature, the duration, or the temperature and the duration.

In other illustrative examples, a smart shower sensor system includes an inlet receiver configured to couple to a water source and receive water from the water source, a conduit fluidly coupled to the inlet receiver and configured to receive the water from the inlet receiver, a temperature sensor configured to sense a temperature of the water in the conduit, and a flow sensor configured to sense a flow of the water through the conduit. An indicator is configured to emit a notification of at least one of the temperature and the flow of the water flowing through the conduit. A processor is configured to: receive, from the temperature sensor, a temperature signal corresponding to the temperature; receive, from the flow sensor, a flow signal corresponding to the flow of the water; and send to the indicator, a notification signal corresponding to at least one of the temperature signal and the flow signal, wherein the indicator emits a notification of at least one of the temperature and the flow in response to receiving the notification signal. The notification is at least one of a visual notification, an auditory notification, and an olfactory notification. The indicator comprises an Internet of Things (IoT) device in wireless communication with the processor.

In yet another illustrative embodiment, a connected water system includes a remote platform including a usage tracker and a behavioral processor, a user device in wireless communication with the remote platform and including a graphical user interface, and a water conduit. The remote platform is configured to: receive, from a temperature sensor, a temperature signal corresponding to a temperature of water in the water conduit; receive, from a flow sensor, a flow signal corresponding to a flow of the water in the water conduit; and send to the user device, a notification signal corresponding to at least one of the temperature signal and the flow signal. The graphical user interface of the user device displays a notification of at least one of the temperature and the flow in response to receiving the notification signal. An output device is in wireless communication with the remote platform via a communication network, the output device including at least one of a light source, a speaker or a diffuser, the output device controlled in response to the notification signal to provide at least one of a visual notification, an auditory notification, or an olfactory notification.

According to another illustrative example, a shower system includes a smart shower sensor including a conduit, a temperature sensor configured to sense a temperature of water in the conduit, and a flow sensor configured to sense a flow of water through the conduit, and a smart shower platform in wireless communication with the smart shower sensor via a communication network, the smart shower platform including a processor and a memory in communication with the processor. A user device is in wireless communication with the smart shower platform via the communication network. The processor is configured to: receive, from the temperature sensor, a temperature signal corresponding to the temperature; receive, from the flow sensor, a flow signal corresponding to the flow of the water; and send to the user device, a notification signal corresponding to at least one of the temperature signal and the flow signal, wherein the user device displays a notification of at least one of the temperature and the flow in response to receiving the notification signal.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

This patent file contains at least one drawing executed in color. Copies of this patent with color drawing(s) will be provided by the office upon request and payment of the necessary fee.

Non-limiting and non-exhaustive examples are described with reference to the following Figures.

DETAILED DESCRIPTION OF THE DRAWINGS

Figure 1A:
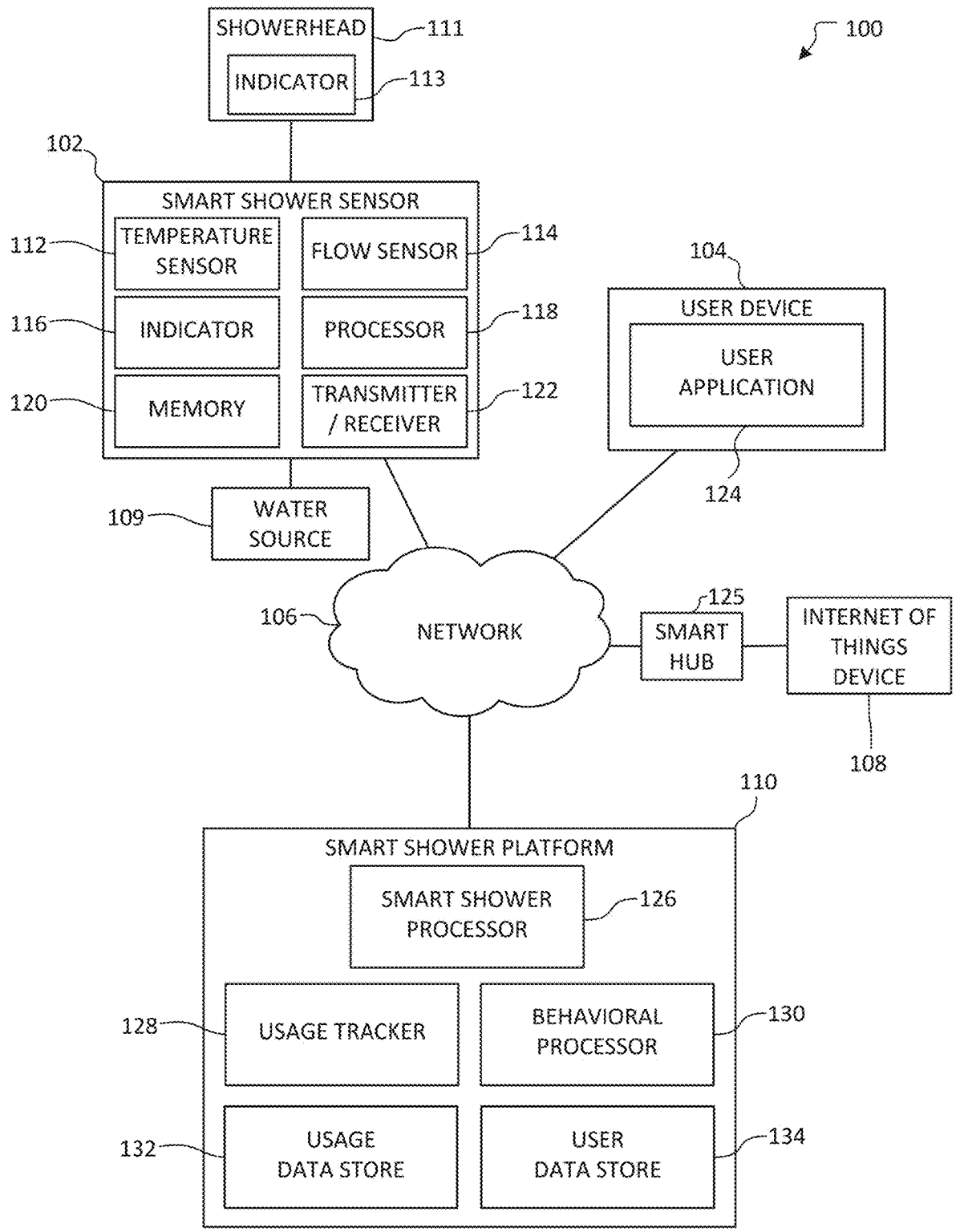
FIG. 1A illustrates an overview of an example smart shower system.

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Embodiments may be practiced as methods, systems or devices. Accordingly, embodiments may take the form of a hardware implementation, an entirely software implementation, or an implementation combining software and hardware aspects. The following detailed description is therefore not to be taken in a limiting sense, and the scope of the present disclosure is defined by the appended claims and their equivalents.

As set forth above, prior to entering a shower, a person generally checks the temperature of the water by putting the person's hand in the water stream to determine the water temperature is suitable for taking a shower. Moreover, a person generally does not know how much water is used while showering. Embodiments disclosed herein solve these problems by disclosing a smart shower system.

In illustrative aspects, the smart shower system allows a user to determine whether the smart shower system is ready for use without having to physically test the water using, for example, the user's hand. Moreover, in illustrative examples, the smart shower system determines usage statistics, which can facilitate determining a user's behavior. Based on the user's behavior, the smart shower system can provide suggestions to modify the user's behavior in order to conserve energy and/or water. Furthermore, in illustrative examples, the usage statistics are used to determine whether the user exhibits recent behavioral changes. In the event the user exhibits recent behavior changes, the smart shower can determine whether the behavior changes are indicative of one or more health concerns (e.g., physical, emotional and/or mental health concerns). In the event the user exhibits one or more health concerns, the smart shower system can provide alerts to the user and/or an associate of the user (e.g., a family member, a friend, a medical professional, etc.).

FIG. 1 illustrates an overview of an example system 100 for a smart shower. As illustrated, system 100 comprises a smart shower sensor 102, a user device 104, a wireless communication network 106, an Internet of Things (IoT) device 108, a smart shower platform 110, and a showerhead 111. However, this diagram is merely an example, which should not unduly limit the scope of the claims. One of ordinary skill in the art would recognize many variations, alternatives, and modifications.

In illustrative examples, smart shower sensor 102, user device 104, IoT device 108, and smart shower platform 110 communicate via network 106, which may comprise a local area network, a wireless network, or the Internet, or any combination thereof, among other examples. User device 104 can be any of a variety of computing devices, including, but not limited to, a mobile computing device (e.g., a smartphone), a laptop computing device, a tablet computing device, or a desktop computing device.

Smart shower platform 110 may be a server computing device or may be a set of computing devices that form a distributed computing device. It will be appreciated that while system 100 is illustrated as comprising a smart shower sensor 102, a user device 104, an IoT device 108, and a smart shower platform 110, any number of such elements may be used in other examples. Further, the functionality described herein with respect to smart shower sensor 102, user device 104, IoT device 108, and smart shower platform 110 may be distributed among or otherwise implemented on any number of different computing devices in any of a variety of other configurations in other examples.

Figure 13:
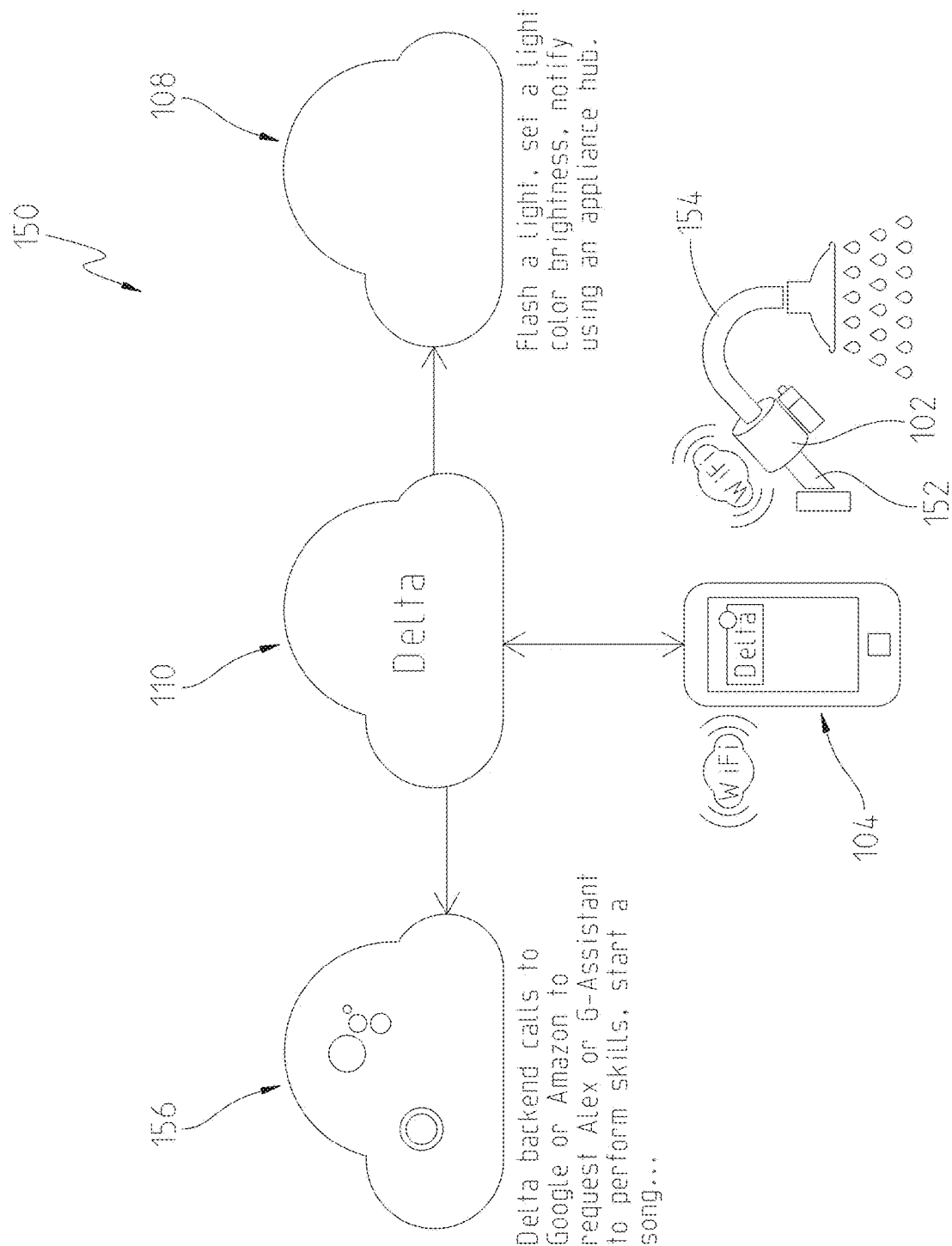
FIG. 13 illustrates an overview of another example smart shower system.

In illustrative aspects, a user installs the smart shower sensor 102 by inserting the smart shower sensor 102 between a water source 109 and a showerhead 111 (see also showerhead 152 illustrated in FIG. 13). In illustrative aspects, the smart shower sensor 102 includes threaded connections on each end of the smart shower sensor 102 for installation. For example, the smart shower sensor 102 may be installed by unscrewing a previously installed showerhead 111 on a water source 109 (e.g., a shower arm or pipe) and screwing in a first end of the smart shower sensor 102 to the water source 109, thereby fluidly coupling the smart shower sensor 102 to the water source 109. Then, the previously installed showerhead 111 may be coupled to a second end of the smart shower sensor 102. In illustrative aspects, the first end is opposite the second end. In illustrative aspects, the showerhead 111 includes one or more indicators 113 to indicate different water temperatures, shower durations, and/or water usages, as described in more detail below. Alternatively, the showerhead 111 does not include one or more indicators 113. Once a user installs the smart shower sensor 102 to a water source, the user turns on the shower handle valve (e.g., a conventional manual mixing valve) so water can begin flowing through the smart shower sensor 102. Additional mechanical aspects of the illustrative smart shower sensor 102 are described in more detail below in relation to FIGS. 14 and 15.

In certain illustrative embodiments, smart shower sensor 102 includes one or more temperature sensors 112, one or more flow sensors 114, one or more indicators 116, one or more processors 118, a memory 120, and/or one or more transmitters/receivers 122. As set forth above, once the shower handle valve (e.g., the conventional manual mixing valve) has been turned on, water will begin flowing through the smart shower sensor 102 via the water source 109. In illustrative instances, the indicator 113, indicator 116, and/or IoT device 108 may change from a "normal" or "rest" setting or mode, to a "shower" or "active" setting or mode when the shower is turned on, and change from a "shower" or "active" setting or mode to a "normal" or "rest" setting or mode after the shower is turned off. Examples of different settings, also referred to herein, as notifications (e.g., temperature notifications, duration notifications, and/or usage notifications), are provided below. Additionally, or alternatively, the indicator 113, indicator 116, and/or IoT device 108 can include different shower themes, such that the indicator 113, indicator 116, and/or IoT device 108 vary their output (e.g., colors) during the duration of a shower to indicate different temperatures, durations, and/or water usage, as explained in more detail below.

Figure 2A:
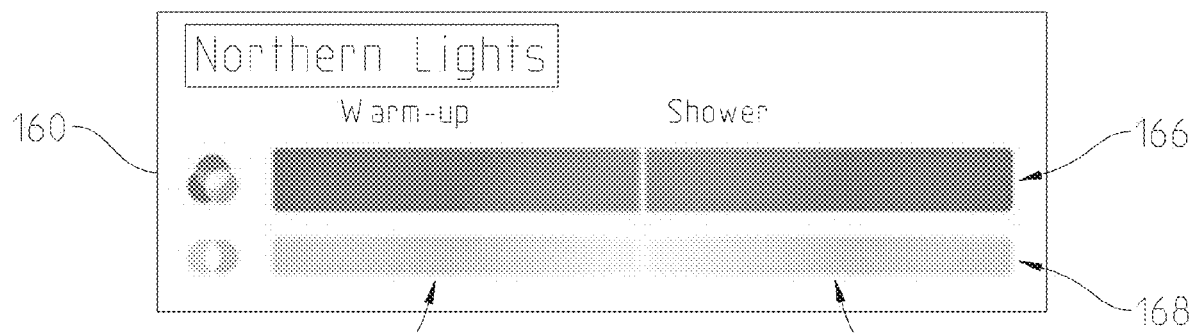
FIGS. 2A-2C illustrates examples of different lighting themes that can configured by a user of the smart shower system.
Figure 2B:
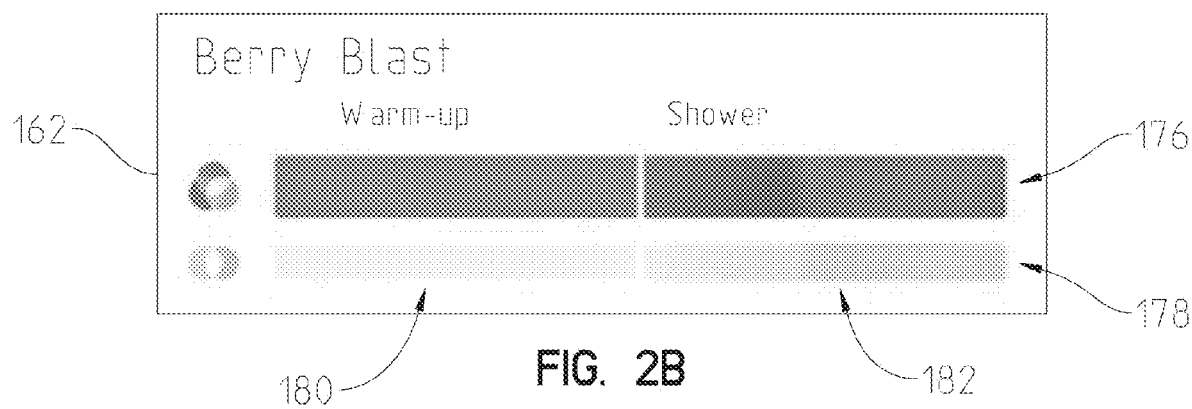
Figure 2C:
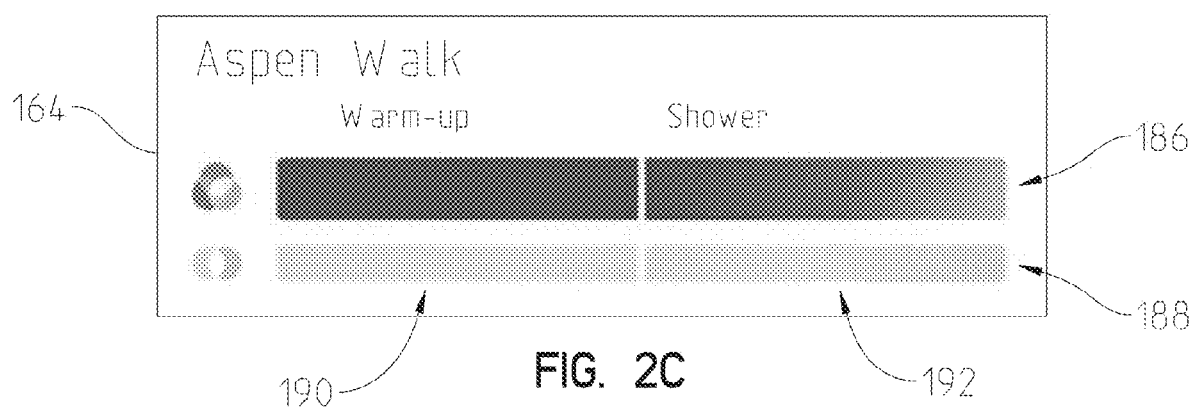

Examples of illustrative shower themes are shown in FIGS. 2A-2C and include, but are not limited to, "Northern Lights" 160, "Berry Blast" 162, and "Aspen Walk" 164. As illustrated, each of the shower themes 160, 162, 164 include different colors emitted by the indicator 113, indicator 116, and/or IoT device 108 when the shower system 100 is warming up (i.e., warm-up mode) and when the shower system 100 is ready to use (i.e., shower or normal mode).

For example, the Northern Lights theme 160 includes color displays 166 and 168 for both a warm-up mode 170 and a shower mode 172. Illustratively, the color display 166 is for use with full color light sources, illustratively light emitting diodes (LEDs), while the color display 168 is for use with limited color light sources, illustratively light emitting diodes (LEDs). Similarly, Berry Blast 162 includes color displays 176 and 178 for both a warm-up mode 180 and a shower mode 182. The color display 176 is for use with full color light sources, illustratively light emitting diodes (LEDs), while the color display 178 is for use with limited color light sources, illustratively light emitting diodes (LEDs). Finally, Aspen Walk 164 includes color displays 186 and 188 for both a warm-up mode 190 and a shower mode 192. The color display 186 is for use with full color light sources, illustratively light emitting diodes (LEDs), while the color display 188 is for use with limited color light sources, illustratively light emitting diodes (LEDs). As used herein, warm-up mode illustratively means that the water is transitioning from a colder temperature to a warmer threshold or setpoint temperature as preset by the user, while the shower mode illustratively defines a substantially stable mode of temperature.

Referring back to FIG. 1, the illustrative temperature sensor 112 senses the temperature of the water flowing through the smart shower sensor 102. In illustrative aspects, the smart shower sensor 102 senses the temperature of the water, via the temperature sensor 112, and notifies the user when the water reaches a specified temperature and/or temperature threshold or setpoint. In illustrative aspects, to notify the user, the processor 118 receives a temperature signal from the temperature sensor 112 corresponding to the temperature of the water flowing through the smart shower sensor 102. The processor 118 can then send a notification signal to the indicator 113 and/or indicator 116 to change in response to various temperatures and/or temperature thresholds. Additionally, or alternatively, to notify the user, the processor 118 may receive a temperature signal from the temperature sensor 112 corresponding to the temperature of the water flowing through the smart shower sensor 102. The processor 118 can then send a signal to the transmitter/receiver 122 to send a notification to the IoT device 108 in response to various temperatures and/or temperature thresholds. The indicator 113, indicator 116, and/or IoT device 108 changing in response to various temperatures and/or temperature thresholds may be referred to herein as providing a temperature notification. Examples of temperature notifications include, but are not limited to visual notifications (e.g., one or more light sources, such as light emitting diodes (LEDs)), auditory notifications (e.g., various sounds), olfactory notifications (e.g., various smells, such as an aromatherapy smell), other sensory notifications (e.g., turning on a heater to warm a room), etc.

In illustrative aspects, the IoT device 108 is installed in one or more locations throughout the home in which the smart shower sensor 120 is installed. For example, the IoT device 108 may be installed in one or more bathrooms, bedrooms, living rooms, kitchens, and/or the like. In certain aspects, the smart shower sensor 102 communicates with the IoT device 108 via a smart hub 125. Additionally, or alternatively, the smart shower sensor 102, IoT device 108, and/or smart hub 125 may communicate with each other via one or more wireless protocols. Examples of wireless protocols includes, but are not limited to, Wi-Fi, Bluetooth, Z-Wave, Zigbee, etc. With respect to FIG. 1B, examples of an IoT devices 108 include, but are not limited to, smart light sources or bulbs (e.g., LEDs) 108A, smart showerheads, smart speakers 108B, smart diffusers 108C, smart appliances, smart thermostats or heaters 108D, etc. Exemplary companies that manufacture IoT devices 108 include, but are not limited to, Philips Hue Lighting System, Hive, Honeywell, Ikea, Innr, Belkin, Sengled, ADT, Wink Somfy, Bosch, GE Appliances, Samsung SmartThings, LG Smart Thing, Lux Konoz, Hogar Milo, Logitech, Fibaro smart sensors, Google, Alexa, Apple, Yale, etc.; and, any IoT devices produced by these companies may be used in the system 100.

As an illustrative example of a temperature notification, indicator 113, indicator 116, and/or IoT device 108 includes a light source, such as a light emitting diode (LED) 108A that emits a first color (e.g., flashes, emits a sequence, and/or provides constant illumination) in response to the temperature of the water being below a temperature threshold.

However, once the temperature of the water meets or exceeds the temperature threshold, the processor 118 sends a notification signal to the LED 108A to change to a second color (e.g., flashes, emits a sequence, and/or provides constant illumination) that is different than the first color. Exemplary colors include, but are not limited to, red, orange, yellow, green, blue, purple, etc. such temperature notifications may be in accordance with the shower theme identified above with respect to FIGS. 2A-2C.

As another illustrative example of a temperature notification, indicator 113, indicator 116, and/or IoT device 108 includes an LED 108A that does not emit light in response to the temperature of the water being below a temperature threshold. However, once the temperature of the water meets or exceeds the temperature threshold, the processor 118 sends a notification signal to the LED 108A to emit a light by the LED 108A (e.g., flashes, emits a sequence, and/or provides constant illumination).

As another example of a temperature notification, indicator 113, indicator 116, and/or IoT device 108 includes an audible device, such as speaker 108B, that is silent in response to the temperature of the water being below a temperature threshold. However, once the temperature of the water meets or exceeds the temperature threshold, the processor 118 sends a notification signal to the speaker 108B to emit a sound indicating the water meets or exceeds the temperature threshold. Exemplary sounds include, but are not limited to, beep, tone, ring, song, etc. As even another illustrative example of a temperature notification, indicator 113, indicator 116, and/or IoT device 108 includes a speaker 108B that emits a first sound (e.g., a beep, tone, ring, song, etc.) in response to the temperature of the water being below a temperature threshold. However, once the temperature of the water meets or exceeds the temperature threshold, the processor 118 sends a notification signal to the speaker 108B to emit a second sound (e.g., a beep, tone ring, song, etc.) indicating the water meets or exceeds the temperature threshold.

As yet another illustrative example of a temperature notification, indicator 113, indicator 116, and/or IoT device 108 includes an aromatherapy device, such as diffuser 108C, that does not emit an aromatherapy mist in response to the temperature of the water being below a temperature threshold. However, once the temperature of the water meets or exceeds the temperature threshold, the processor 118 sends a notification signal to the diffuser 108C to emit an aromatherapy mist indicating the water meets or exceeds the temperature threshold.

Additionally, or alternatively, to notify the user, the processor 118 illustratively receives a temperature signal from the temperature sensor 112 corresponding to the temperature of the water. The processor 118 can then send a signal to the transmitter/receiver 122 to send a notification to the user device 104 in response to various temperatures and/or temperature thresholds. Similar to above, the user device 104 providing a notification in response to various temperatures and/or temperature thresholds may also be referred to herein as providing a temperature notification. Examples of temperature notifications include, but are not limited to, visual notifications (e.g., banners, texts, pop-ups, etc.), auditory notifications (e.g., various sounds), olfactory notifications (e.g., various smells, such as an aromatherapy smell), haptic feedback (e.g., vibrations), other sensory notifications (e.g., turning on a heater to warm a room), etc.

In certain illustrative aspects, indicator 113, indicator 116, the user device 104, and/or the IoT device 108 can provide different notifications for different temperature thresholds. For example, a first temperature threshold may correspond to a desired (or set point) water temperature and a second temperature threshold may correspond to a water temperature that may cause burns. In these instances, the indicator 113, indicator 116, the user device 104, and/or IoT device 108 can provide a first notification when the water temperature is below the first temperature threshold, a second notification when the water temperature is between the first and second temperature thresholds, and a third notification when the water temperature meets or exceeds the second temperature threshold. In certain instances, the third notification may be referred to herein as a burn alert when the water temperature meets or exceeds the second temperature threshold.

In certain illustrative instances, the specified temperature and/or temperature threshold at which a temperature notification is provided is set to an initial temperature and/or temperature threshold. However, in certain illustrative embodiments, a user can configure, via the user device 104, the specified temperature and/or temperature threshold at which a temperature notification is provided based on the user's preferences. For example, if a first user prefers taking a colder shower and a second user prefers to take a warmer shower, then the first user can configure the temperature notification to occur at a lower specified temperature and/or lower temperature threshold than the temperature notification provided to the second user based on the second user's preferences.

As set forth above, the smart shower sensor 102 includes a flow sensor 114, according to certain illustrative embodiments. According to certain illustrative embodiments, the flow sensor 114 senses whether water is flowing through the smart shower sensor 102 and/or how much water is flowing through the smart shower sensor 102. In illustrative aspects, the smart shower sensor 102 senses water is flowing through the smart shower sensor 102 and provides a notification and/or transmits a notification after a predetermined amount of time has passed since water began flowing through the smart shower sensor 102 and/or after a predetermined amount of water has passed through the smart shower sensor 102. In these illustrative aspects, the smart shower sensor 102, and/or IoT device 108 notifies the user of the user's water consumption. As such, the user can modify the user's behavior in order to reduce energy and/or water consumption.

In illustrative aspects, to notify the user, the processor 118 receives a flow signal from the flow sensor 114 corresponding to water passing through the smart shower sensor 102. The processor 118 can then start a counter to determine how long water has been passing through the smart shower sensor 102. Further, in aspects, the processor 118 sends a notification signal to the indicator 113, indicator 116, and/or the IoT device 108 to change in response to various durations. The indicator 113, indicator 116, and/or IoT device 108 changing in response to various durations may be referred to herein as providing a duration notification. Examples of duration notifications include, but are not limited to visual notifications (e.g., one or more LEDs), auditory notifications (e.g., various sounds), olfactory notifications (e.g., various smells, such as an aromatherapy smell), other sensory notifications (e.g., turning on a heater to warm a room), etc. In certain instances, a duration notification may also be referred to herein as a conservation alert.

As an illustrative example of a duration notification, indicator 113, indicator 116, and/or IoT device 108 includes a light source (such as an LED 108A) that emits a first color (e.g., flashes, emits a sequence, and/or provides constant illumination) in response to the duration of the shower being below a duration threshold. However, once the duration of the shower meets or exceeds the duration threshold, the processor 118 sends a notification signal to the LED 108A to change to a second color (e.g., flashes, emits a sequence, and/or provides constant illumination) that is different than the first color. Such duration notifications may be in accordance with the shower themes identified above with respect to FIGS. 2A-2C.

As another illustrative example of a duration notification, indicator 113, indicator 116, and/or IoT device 108 includes an LED 108A that does not emit light in response to the duration of the shower being below a duration threshold. However, once the duration of the shower meets or exceeds the duration threshold, the processor 118 sends a notification signal to the LED 108A to emit a light by the LED 108A.

As another illustrative example of a duration notification, indicator 113, indicator 116, and/or IoT device 108 includes an audible device, such as speaker 108B, that is silent in response to the duration of the shower being below a duration threshold. However, once the duration of the shower meets or exceeds the duration threshold, the processor 118 sends a notification signal to the speaker 108B to emit a sound indicating the shower meets or exceeds the duration threshold. As even another illustrative example of a duration notification, indicator 113, indicator 116, and/or IoT device 108 includes a speaker 108B that emits a first sound (e.g., a beep, tone, ring, song, etc.) in response to the duration of the shower being below a duration threshold. However, once the duration of the shower meets or exceeds the duration threshold, the processor 118 sends a notification signal to the speaker 108B to emit a second sound (e.g., a beep, tone ring, song, etc.) indicating the shower meets or exceeds the duration threshold.

As yet another illustrative example of a duration notification, indicator 113, indicator 116, and/or IoT device 108 includes an aromatherapy device, such as diffuser 108C, that does not emit an aromatherapy mist in response to the duration of the shower being below a duration threshold. However, once the duration of the shower meets or exceeds the duration threshold, the processor 118 sends a notification signal to the diffuser 108C to emit an aromatherapy mist indicating the shower meets or exceeds the duration threshold.

As yet another illustrative example of a duration notification, IoT device 108 includes or is coupled to a heater 108D (e.g., space heater or furnace) that does not turn on or maintains a first temperature in response to the duration of the shower being below a duration threshold. However, once the duration of the shower meets or exceeds the duration threshold, the processor 118 sends a notification signal to the heater 108D to turn on and/or increase the temperature of a room to a second temperature that is greater than the first temperature indicating the shower meets or exceeds the duration threshold. As such, when a user steps out of the shower, the bathroom will be heated and will not feel as cool as the bathroom otherwise would.

Additionally, or alternatively, to notify the user, the processor 118 receives a flow signal from the flow sensor 114 corresponding to water passing through the smart shower sensor 102. The processor 118 can then send a signal to the transmitter/receiver 122 to send a notification to the user device 104 in response to various durations and/or duration thresholds. Similar to above, the user device 104 providing a notification in response to various durations and/or duration thresholds may also be referred to herein as providing a duration notification. Examples of duration notifications include, but are not limited to, visual notifications (e.g., banners, texts, pop-ups, etc.), auditory notifications (e.g., various sounds), olfactory notifications (e.g., various smells, such as an aromatherapy smell), haptic feedback (e.g., vibrations), other sensory notifications (e.g., turning on a heater to warm a room), etc.

In certain illustrative aspects, indicator 113, indicator 116, user device 104, and/or IoT device 108 can provide different notifications for different duration thresholds. For example, a first duration threshold may correspond to a first duration and a second duration threshold may correspond to a second duration that is longer than the first duration. In these illustrative instances, indicator 113, indicator 116, user device 104, and/or the IoT device 108 can provide a first notification when the duration is less than the first duration threshold, a second notification when the duration is between the first and second durations thresholds, and a third notification when the duration meets or exceeds the second duration threshold. In these illustrative aspects, the second notification can serve as a final notification that the user should end the user's shower based on the user's preferences and the first notification can serve as an early notification of the final notification so the user can begin the process of wrapping up the user's shower. In illustrative instances after the user's shower has ended indicated by the flow sensor 114 no longer sensing water flow, indicator 113, indicator 116, user device 104, and/or IoT device 108 can return to a "normal" setting.

In certain illustrative instances, the duration threshold at which a duration notification is provided is set to an initial duration threshold. However, in certain embodiments, a user can configure, via the user device 104, the duration threshold at which a duration notification is provided based on the user's preferences. For example, if a first user prefers taking a shorter shower and a second user prefers to take a longer shower, then the first user can configure the duration notification to occur at an earlier time than the duration notification provided to the second user based on the second user's preferences.

Additionally, or alternatively, the processor 118 receives a flow signal from the flow sensor 114 corresponding to how much water has passed through the smart shower sensor 102 since a shower began. As such, the processor 118 can track the amount of water usage during a shower. In illustrative aspects, the processor 118 sends a notification signal to the indicator 113, indicator 116, and/or the IoT device 108 to change in response to various amounts of water usage. The indicator 113, indicator 116, and/or IoT device 108 changing in response to various water usage may be referred to herein as providing a usage notification. Examples of usage notifications include, but are not limited to visual notifications (e.g., one or more LEDs), auditory notifications (e.g., various sounds), olfactory notifications (e.g., various smells, such as an aromatherapy smell), other sensory notifications (e.g., turning on a heater to warm a room), etc.

As an illustrative example of a usage notification, indicator 113, indicator 116, and/or IoT device 108 includes a light source, such as LED 108A, that emits a first color (e.g., flashes, emits a sequence, and/or provides constant illumination) in response to the water usage being below a usage threshold. However, once the water usage meets or exceeds the usage threshold, the processor 118 sends a notification signal to the LED 108A to change to a second color (e.g., flashes, emits a sequence, and/or provides constant illumination) that is different than the first color. Such usage notifications may be in accordance with the shower themes identified above with respect to FIGS. 2A-2C.

As another illustrative example of a usage notification, indicator 113, indicator 116, and/or IoT device 108 includes an LED 108A that does not emit light in response to the water usage being below a usage threshold. However, once the water usage meets or exceeds the usage threshold, the processor 118 sends a notification signal to the LED 108A to emit a light by the LED 108A.

As another illustrative example of a usage notification, indicator 113, indicator 116, and/or IoT device 108 includes an audible device, such as speaker 108B, that is silent in response to the water usage being below a usage threshold. However, once the water usage meets or exceeds the usage threshold, the processor 118 sends a notification signal to the speaker 108B to emit a sound indicating the shower meets or exceeds the usage threshold. As even another illustrative example of a usage notification, indicator 113, indicator 116, and/or IoT device 108 includes a speaker 108B that emits a first sound (e.g., a beep, tone, ring, song, etc.) in response to the water usage being below a usage threshold. However, once the water usage meets or exceeds the usage threshold, the processor 118 sends a notification signal to the speaker 108B to emit a second sound (e.g., a beep, tone ring, song, etc.) indicating the shower meets or exceeds the usage threshold.

As yet another illustrative example of a usage notification, indicator 113, indicator 116, and/or IoT device 108 includes an aromatherapy device, such as diffuser 108C, that does not emit an aromatherapy mist in response to the water usage being below a usage threshold. However, once the water usage meets or exceeds the usage threshold, the processor 118 sends a notification signal to the diffuser 108C to emit an aromatherapy mist indicating the shower meets or exceeds the usage threshold.

As yet another example of a usage notification, IoT device 108 includes or is coupled to a heater 108D (e.g., space heater or furnace) that does not turn on or maintains a first temperature in response to the water usage being below a usage threshold. However, once the water usage meets or exceeds the usage threshold, the processor 118 sends a notification signal to the heater 108D to turn on and/or increase the temperature of a room to a second temperature that is greater than the first temperature indicating the shower meets or exceeds the usage threshold. As such, when a user steps out of the shower, the bathroom will be heated and will not feel as cool as the bathroom otherwise would.

Additionally, or alternatively, to notify the user, the processor 118 receives a flow signal from the flow sensor 114 corresponding to the amount of water used during a shower. The processor 118 can then send a signal to the transmitter/receiver 122 to send a notification to the user device 104 in response to various water usage thresholds. Similar to above, the user device 104 providing a notification in response to various water usage thresholds may also be referred to herein as providing a usage notification. Examples of usage notifications include, but are not limited to, visual notifications (e.g., banners, texts, pop-ups, etc.), auditory notifications (e.g., various sounds), olfactory notifications (e.g., various smells, such as an aromatherapy smell), haptic feedback (e.g., vibrations), other sensory notifications (e.g., turning on a heater to warm a room), etc.

In certain illustrative instances, the usage threshold at which a usage notification is provided is set to an initial usage threshold. However, in certain embodiments, a user can configure, via the user device 104, the usage threshold at which a usage notification is provided based on the user's preferences. For example, if a first user uses more water than a second user but would like to use less water than the second user, the first user can configure the usage notification to occur at an earlier time than the usage notification provided to the second user based on the second user's preferences.

In illustrative aspects, the flow sensor 114 can be used to determine whether the shower is malfunctioning (e.g., a leaking, freeze, and/or intrusion). For example, the user device 104, the IoT device 108, and/or the smart shower platform 110 can receive a signal from the flow sensor 114 indicating water flow and the user device 104, the IoT device 108, and/or the smart shower platform 110 can determine that water should not be flowing based on, for example, proximity of a user device 104 to the shower, water flow characteristics (e.g., a small amount of water flow), user preferences, etc.

In illustrative aspects, the temperature threshold, the duration threshold, and/or the usage threshold pertaining to a particular user can be stored as the user's preferences. According to certain embodiments, the user's preferences are stored in memory 120 of the smart shower sensor 102. Additionally, or alternatively, the user's preferences can be stored in memory of the user device 104 and/or in memory of the smart shower platform 110 (e.g., the user data store 134). In certain instances, the user's preferences are stored as part of user profile on the user device 104 and/or the smart shower platform 110.

In illustrative aspects, a user is able to pair the user device 104 to the smart shower sensor 102. By doing so, the user device 104, illustratively via the processor 118, can automatically configure the smart shower sensor 102 according to the user's preferences when the user takes a shower. For example, the smart shower sensor 102 receives, via the transmitter/receiver 122, a signal from the user device 104 when the user device is in proximity to the smart shower sensor 102. The processor 118 of the smart shower sensor 102 can then set the temperature notification, duration notification, and/or usage notification based on the user that is about to shower. In illustrative aspects, a user can select, via the user application 124, a user profile from a plurality of user profiles illustratively stored in memory 120. And, the smart shower sensor 102 can configure the temperature notification, duration notification, and/or usage notification based on a selected user profile.

User device 104 is illustrated as including user application 124. In illustrative examples, user application 124 is a web browser, a native application, or a combination thereof. Via the user application 124, a user can setup the smart shower sensor 102 and/or create a user profile according to the user's preferences and/or shower data pertaining to temperature thresholds, duration thresholds, and/or usage thresholds. In aspects, user application 124 also stores new shower data. Additionally, or alternatively, user application 124 communicates with smart shower sensor 102 and/or smart shower platform 110 to perform notification and/or configuration aspects described herein. For example, user application 124 facilitates configuration by the user of temperature thresholds, duration thresholds, and/or usage thresholds. As another illustrative example, user application 124 provides notifications when temperature thresholds, duration thresholds, and/or usage thresholds are met or exceeded. As yet another illustrative example, user application 124 provides shower data to the smart shower platform 110 so the smart shower platform 110 can perform one or more aspects described below in relation to the smart shower platform 110.

Figure 3B:
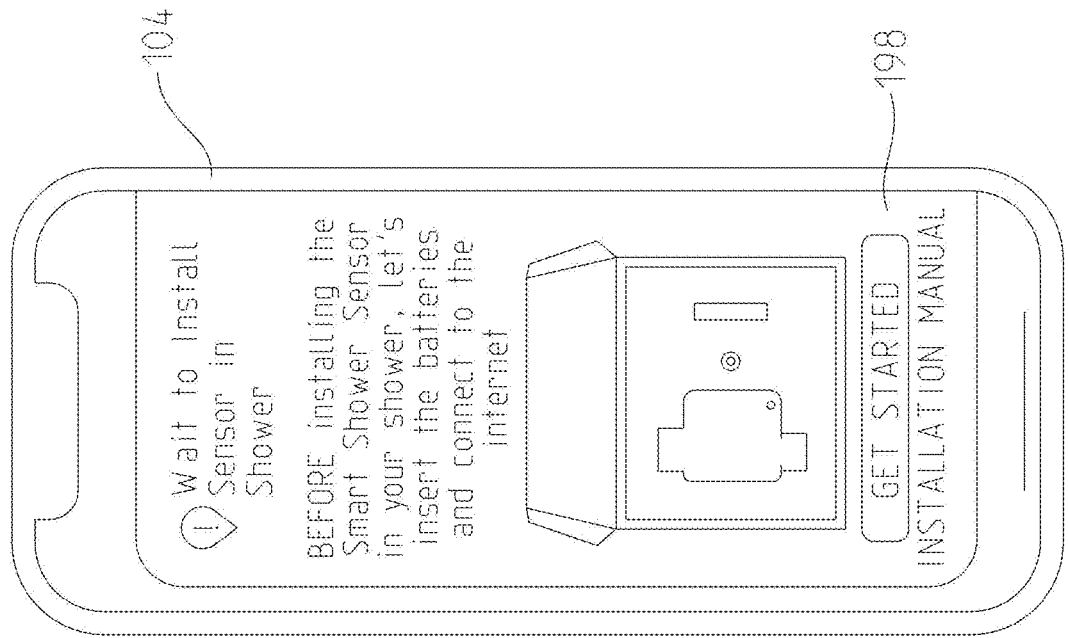
FIGS. 3A and 3B illustrates an example user interface for setting up the smart shower system.
Figure 3A:
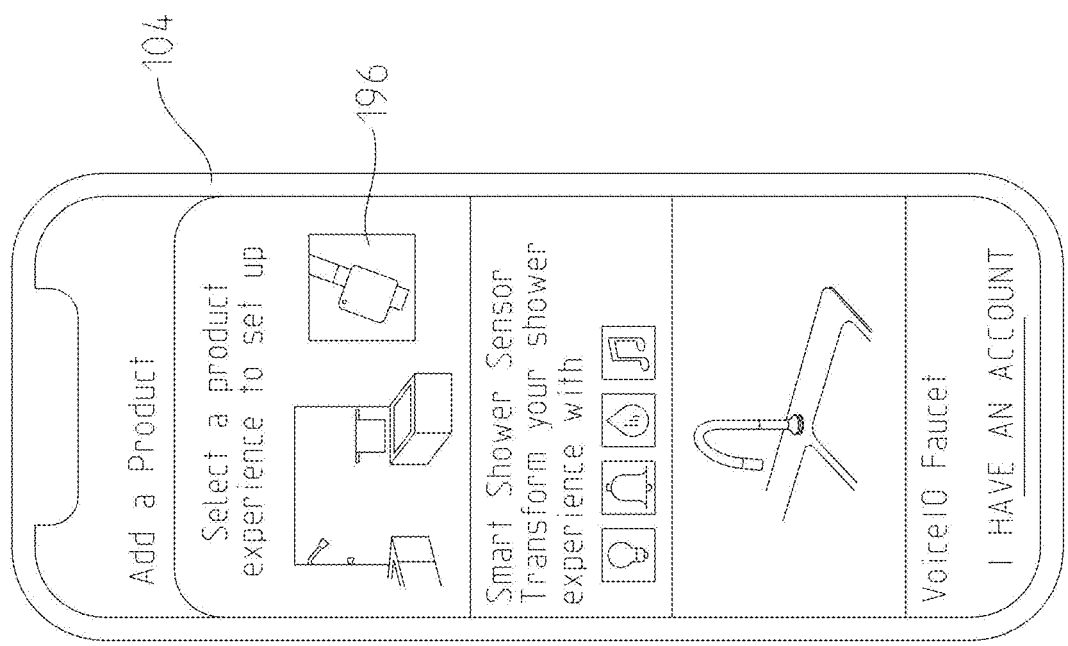

For example, FIGS. 3A and 3B illustrates an example smart shower sensor 102 setup via the user application 124 stored in the user device 104, illustratively a smart phone. As illustrated, a user can select to setup a smart shower sensor 102 by selecting a smart shower icon 196 on the user application 124 (FIG. 3A). In response to selecting the smart shower icon 196, the user application 124 can provide a get started icon 198 (FIG. 3B). Once the get started icon 198 is selected, a user can pair the user device 104 to the smart shower sensor 102, and configure the user's preferences and/or register the smart shower sensor 102, illustratively by communication through the network 106.

Figure 4:
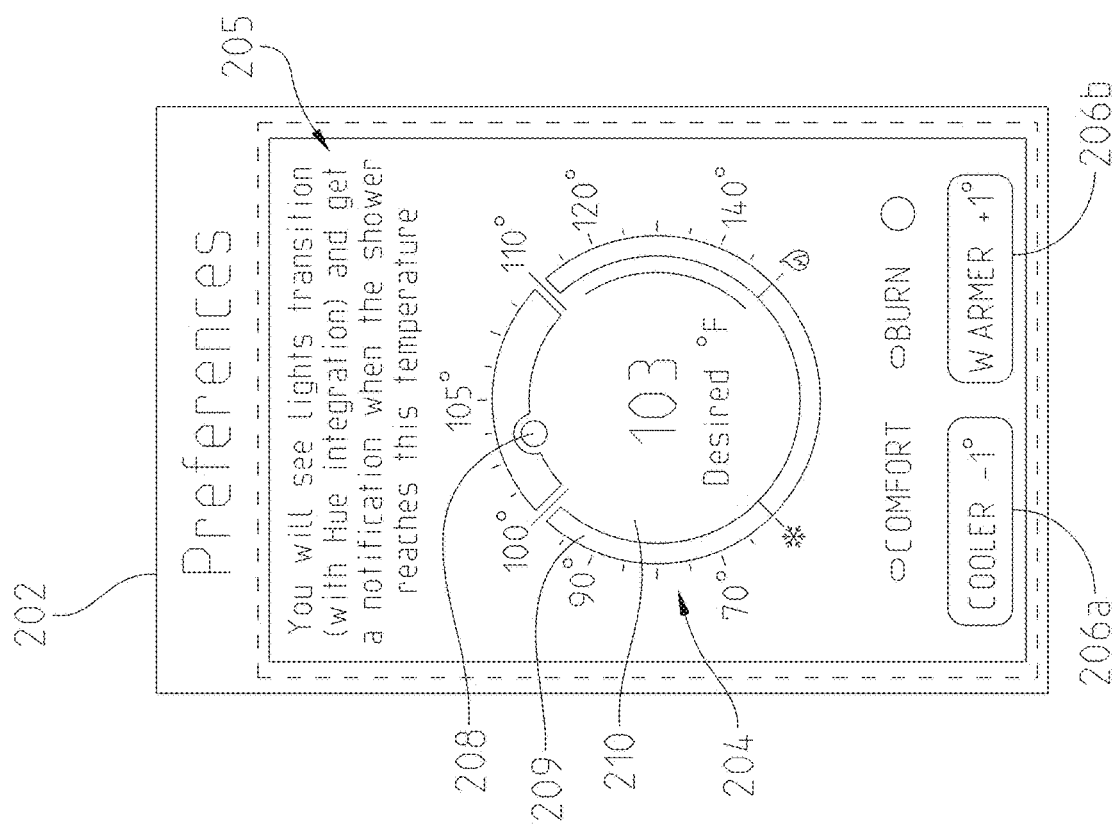
FIG. 4 illustrates an example user interface for configuring a user's preferences of the smart shower system.

An illustrative user interface 202 for setting or customizing temperature preferences as defined by the user application 124 on the user device 104 is shown in FIG. 4. A temperature indicator 204 and a notification display 205 are shown on the user interface 202. To configure the user's preferences, the user can increase or decrease the temperature at which a temperature notification is provided (i.e., threshold or setpoint temperature) by pressing a cooler or temperature decrease button 206a to incrementally lower the threshold temperature by 1° F., or by pressing a warmer or temperature increase button 206b to incrementally raise the threshold temperature by 1° F. In response, a temperature indicator 208 will move down or up (counter-clockwise or clockwise), respectively, along a graduated temperature dial 209. The dial 209 may be color coded to represent temperature, where cooler temperatures are represented by blue in section 209A, higher temperatures are represented by red in section 209B, and intermediate temperatures are represented by a mixture of blue and red (e.g., purple) in section 209C.

Alternatively, or in addition thereto, a user can change the threshold or setpoint temperature by sliding the temperature indicator 208 to a lesser or greater temperature (i.e., counter-clockwise or clockwise, respectively) along the temperature dial 209. A digital temperature display 210 of the user desired or setpoint temperature is also provided. Then, once the smart shower sensor 102 reaches the setpoint temperature, indicator 113, indicator 116, and/or IoT device 108 can provide a temperature notification, as described above.

Figure 5:
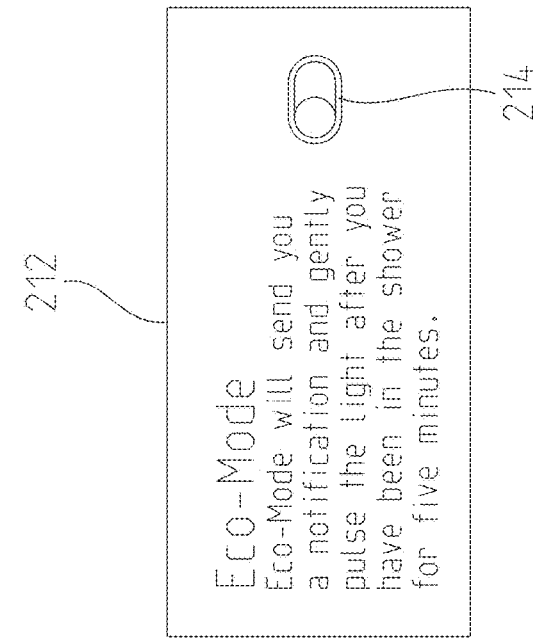
FIG. 5 illustrates an example user interface for activating an eco-mode of the smart shower system.

Additionally, or alternatively, a user can select an economy mode or eco-mode 212 as shown in FIG. 5 by activating a toggle button 214. After a certain detected duration and/or water usage, indicator 113, indicator 116, and/or IoT device 108 may provide a duration notification and/or water usage notification, as described above.

Figure 6:
FIG. 6 illustrates an example user interface for viewing shower statistics related to water temperature of the smart shower system.
Figure 7:
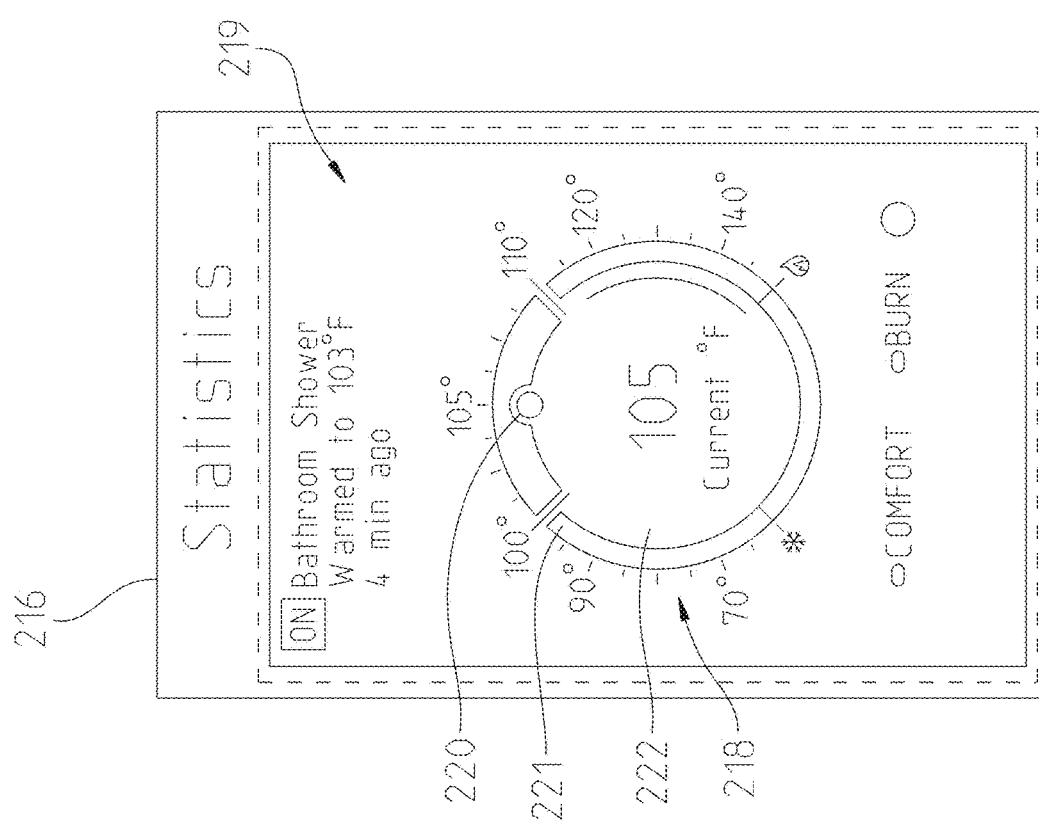
FIG. 7 illustrates an example user interface for viewing shower statistics related to water usage of the smart shower system.

Via the user application 124 of the user device 104, a user can also view a water temperature statistics user interface 216 and/or a water usage statistics user interface 224, as illustrated in FIGS. 6 and 7, respectively. With further reference to FIG. 6, the user interface 216 defined by the user application 124 on the user device 104 illustratively provides real-time water temperature statistics via a temperature indicator 218 and a notification panel 219. A temperature indicator 220 is provided along a graduated temperature dial 221 to provide an indication of current water temperature detected by temperature sensor 112. The dial 221 may be color coded to represent temperature, where cooler temperatures are represented by blue in section 221A, higher temperatures are represented by red in section 221B, and intermediate temperatures are represented by a mixture of blue and red (e.g., purple) in section 221C. A digital temperature display 222 of current water temperature may also be provided. FIG. 7 illustrates the user interface 224 displaying cumulative water usage statistics including, for example, name of the smart shower sensor, water usage during the last operation, water usage for a first duration (for example, 30 days), and/or water usage for a second duration (for example, current year).

Figure 8:
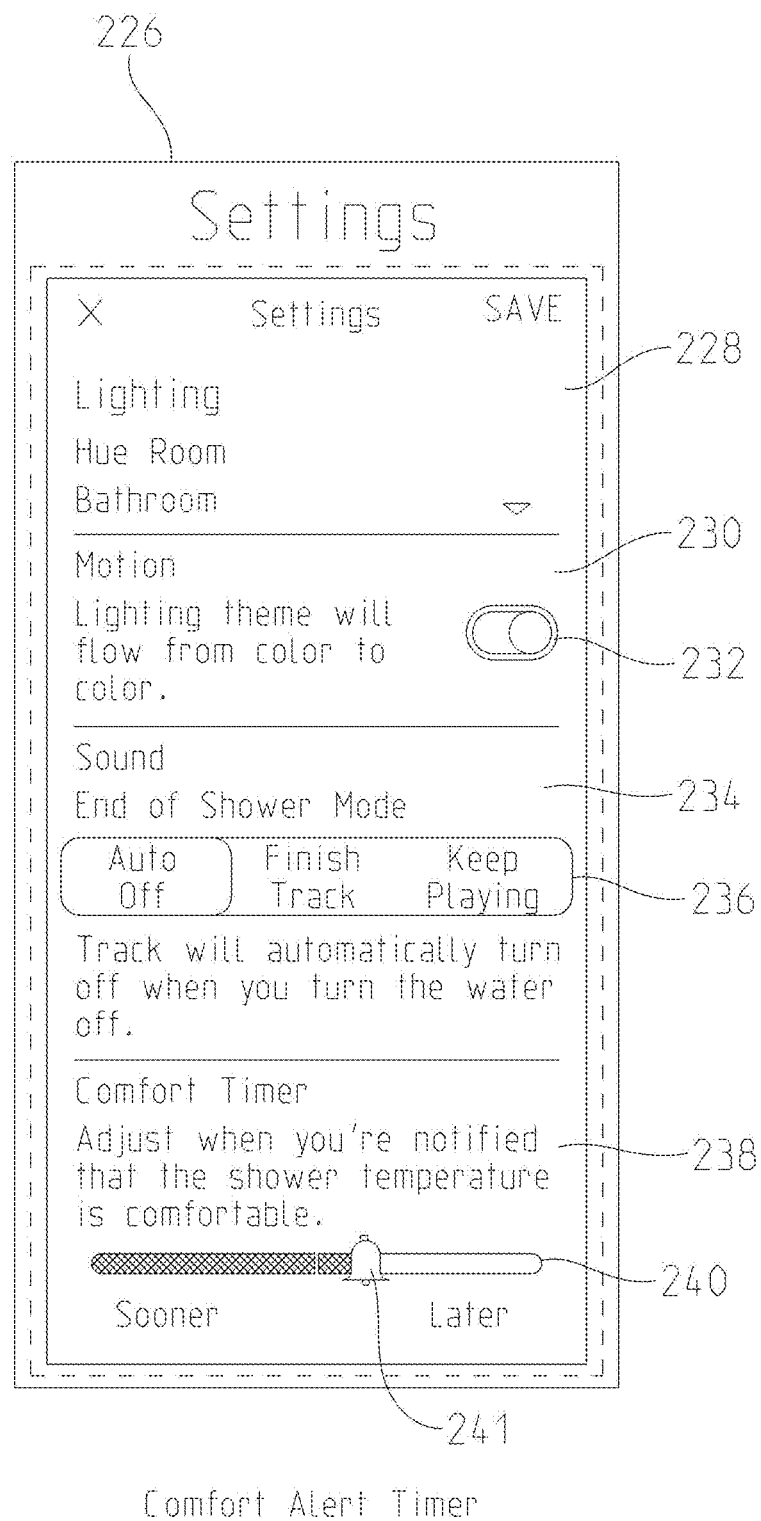
FIG. 8 illustrates an example user interface for setting user preferences of sensors of the smart shower system.

FIG. 8 shows an illustrative comfort alert timer user interface 226 for setting or customizing certain user preferences. This user interface 226 may be used in addition, or as an alternative to the user interface 202 of FIG. 4. More particularly, the user interface 226 provides settings for a comfort alert timer for when a desired threshold or setpoint temperature has been reached, for example, during a warm-up mode. Settings panel 228 of the user interface 226 allows the user to set which internet of things device 108, illustratively in the form of LEDs 108A, to activate once the threshold or setpoint temperature has been reached. Motion panel 230 of the user interface 226 allows the user to set the LEDs 108A to provide for a flowing configuration. In other words, by toggling switch 232 the lighting theme will move or flow between different colors.

Sound panel 234 of the user interface 226 allows the user to select at input bar 236 whether sound should (1) automatically turn-off when the water flow stops, (2) continue to play to finish the track regardless of water flow, or (3) continue to play indefinitely. At comfort timer panel 238, the comfort alert timer may be adjusted via a slide bar 240. More particularly, an indicator 241 may be adjusted along the slide bar 240 to define the threshold or setpoint temperature. Movement from left to right of the indicator 241 along the slide bar 240 increases the threshold or setpoint temperature. As such, water temperature will tend to reach the setpoint temperature sooner when the indicator 241 is in the left-most position along the bar 240, and tend to reach a setpoint temperature later when the indicator 241 is in the right-most position along the bar 240.

Figure 9:
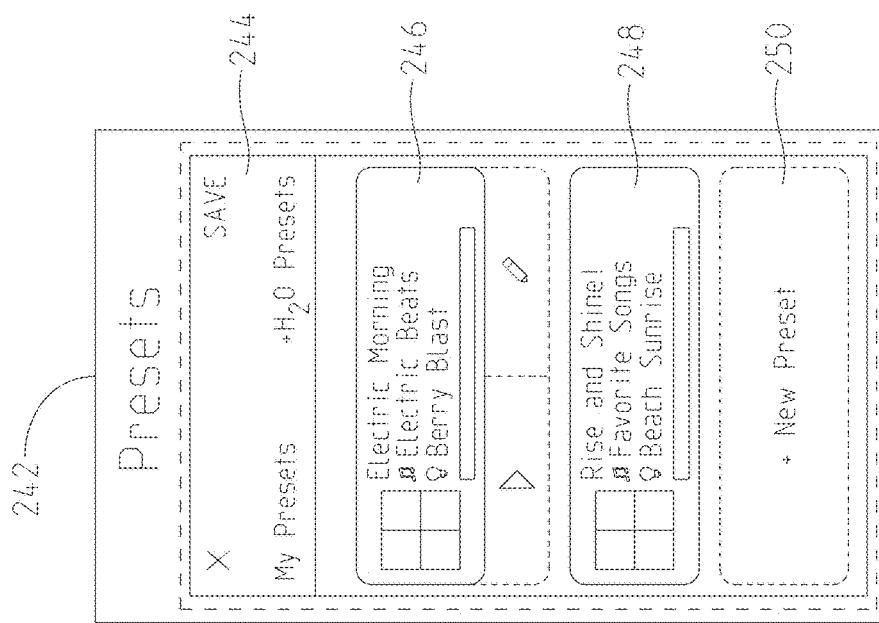
FIG. 9 illustrates an example user interface of user created presets of the smart shower system.

FIG. 9 shows an illustrative personalized preset selection user interface 242 displaying stored user presets. Notification panel 244 identifies the user interface 242 for identifying predefined user presets. As detailed above, these user presets may be customized, for example, in either of the user interfaces 202 and 226 of FIGS. 4 and 8, respectively. User interface 202, 226 may be accessed by pressing panel 244 with the current preset 246, 248 selected in the user interface 242. The selected preset 246, 248 may then be customized via the respective selected user interface 202, 226 as further detailed herein. Preset 246 is a user-defined preset named "Electric Morning", and includes a sound theme defined as "Electric Beats" and lighting theme defined as "Berry Blast". A second preset 248 is named "Rise and Shine", and includes a sound theme defined as "Favorite Songs" and a lighting theme named "Beach Sunrise". A new preset may be defined by pressing button 250, which then opens a personalized preset creation user interface 252 of FIG. 10.

Figure 10:
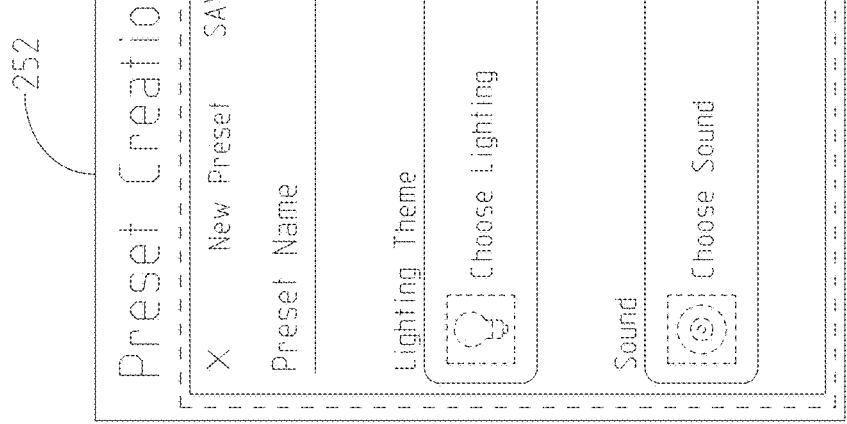
FIG. 10 illustrates an example user interface for establishing a new preset of the smart shower system.

FIG. 10 shows illustrative user interface 252 including a screen displayed to the user, for example, when he/she has selected "new preset" on the personalized preset selection interface of FIG. 9. A user may name the preset at new preset panel 254. A lighting theme may be selected at lighting theme panel 256, and a sound theme may selected at sound theme panel 258. The user interface 252 may expand to include other integrations (e.g., other IoT devices 108) as they are further developed.

Figure 11:
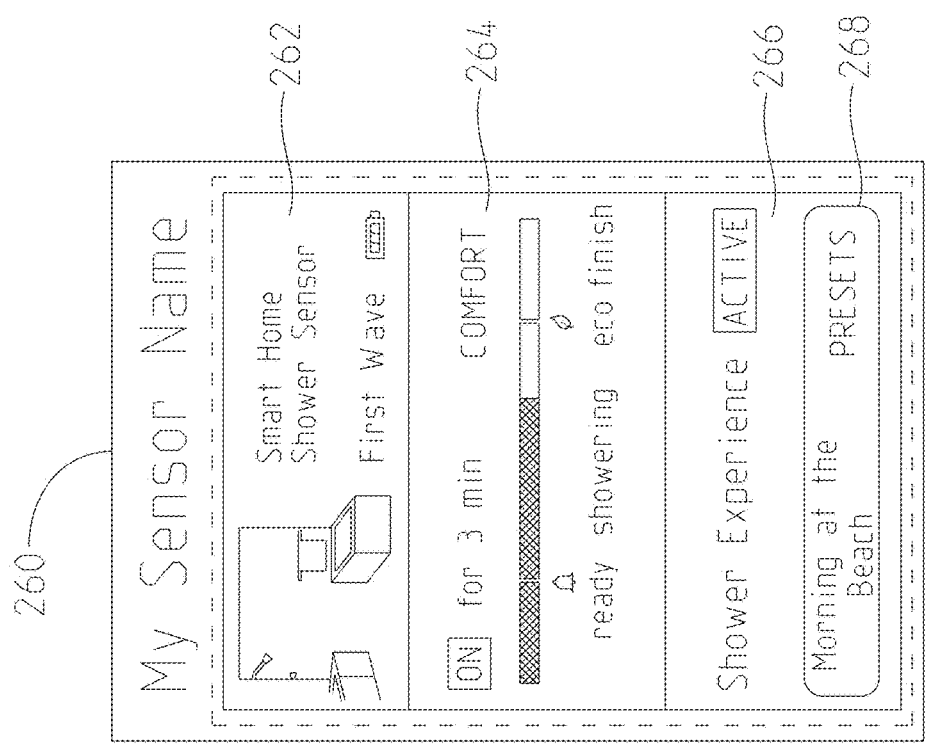
FIG. 11 illustrates an example user interface showing the current state of an active smart shower system with temperature information.

FIG. 11 shows an illustrative status indication user interface 260 which may provide a default display of status indication during active operation of the shower system 100. More particularly, display panel 262 illustrates the current state of the active shower system 100, with temperature information provided at temperature panel 264. In temperature panel 264, ab temperature indicator bar and text above the bar may provide temperature information. In FIG. 11, comfort is the current temperature indicator and is further represented by color of the associated bar (e.g., blue for cold, red for hot, and/or purple for intermediate temperatures). The amount of fill of the bar and corresponding text above the bar may indicate how long the user has been in the shower. This is illustratively relative to a 5 minute eco-mode alert. Shower experience panel 266 shows the user's selected preset and whether such preset is active. By depressing button 268, the shower system 100 illustratively returns to the personalized preset selection user interface 242 of FIG. 9. As such, the user may change the preset during active operation.

Figure 12:
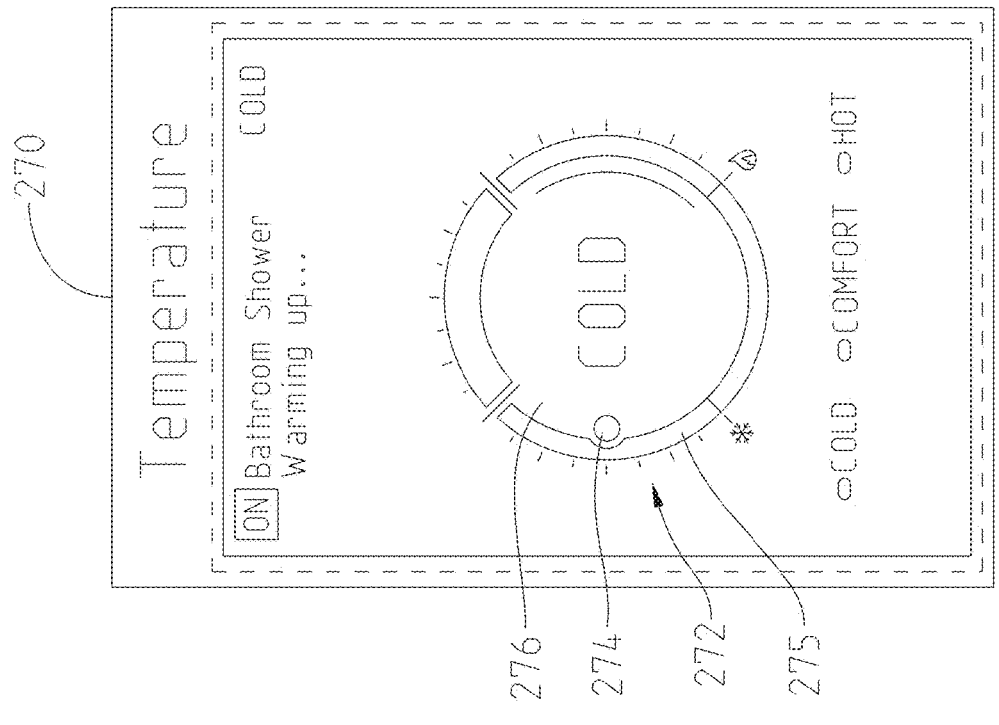
FIG. 12 illustrates an example user interface including a live indicator similar to the user interface of FIG. 6, but without raw temperature values.

FIG. 12 shows an illustrative temperature indicator user interface 270 that may be an option in addition to, or as a replacement to, user interface 260 of FIG. 11. FIG. 12 is similar to the user interface 216 of FIG. 6 but without raw temperature values displayed. More particularly, a general temperature display 272 includes an indicator 274 configured to move along a dial 275. The dial 275 may be color coded to represent temperature, where cooler temperatures are represented by blue in section 275A, higher temperatures are represented by red in section 275B, and intermediate temperatures are represented by a mixture of blue and red (e.g., purple) in section 275C. A general digital indication of temperature (e.g., cold, warm, hot) may be provided at display 276.

Figure 1B:
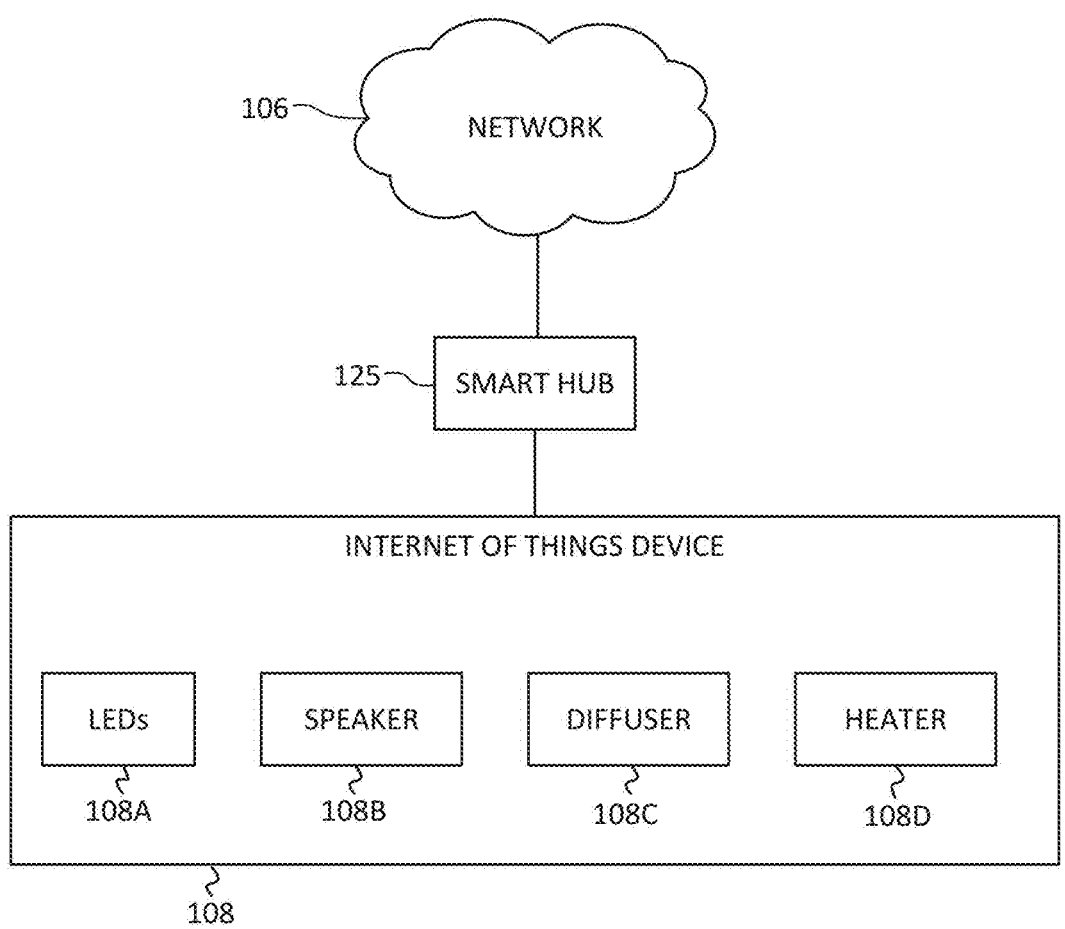
FIG. 1B illustrates an example interface with internet of things devices in the smart shower system of FIG. 1A.

As illustrated, for example in FIG. 1A, smart shower platform 110 includes a smart shower processor 126, a usage tracker 128, a behavioral processor 130, a usage data store 132, and/or a user data store 134. In illustrative embodiments, smart shower processor 126 communicates with one or more other devices (e.g., smart shower sensor 102, user application 124 of user device 104, and/or IoT device 108) to provide aspects of the smart shower platform 110 described herein. For example, smart shower processor 126 generates a website (e.g., which may be accessed by application 124) with which to configure and/or manage a user's preferences, such as the temperature threshold, duration threshold, and/or usage threshold. In other examples, smart shower processor 126 provides an application programming interface (API) (e.g., which may be used by application 124) to perform such aspects as an alternative or in addition to a website.

Additionally, or alternatively, smart shower processor 126 receives user preferences from the user device 104 and stores the user preferences in the user data store 134. In aspects, smart shower processor 126 receives shower data corresponding to temperatures, durations, and/or water usages for a plurality of showers from the smart shower sensor 102, the user device 104, and/or the smart shower processor 126. In aspects, the user tracker 128 tracks the shower data for one or more users. Based on the shower data, the usage tracker 128 can determine trends for one or more user's shower data. In certain examples, the usage tracker 128 may use a linear regression model or non-linear regression model to determine user trends.

In illustrative aspects, the usage tracker 128 provides trend notifications to the user device 104 about the user trends, such as whether the temperature, duration, and/or water usage of the user's showers has been increasing, decreasing, or constant. In certain aspects, the trend notification can provide real-time "gauge" readouts, and/or include a graph of the user trends. In certain aspects, the trend notification can also be used in multi-dwelling buildings, and/or in commercial use for monitoring hotel shower usage, which can be helpful in determining whether a shower needs to be cleaned. Additionally, or alternatively, the user tracker 128 can provide behavioral suggestions to the user via the user device 104 so the user can decrease water usage and/or decrease energy consumption, for example, by taking colder showers.

In illustrative aspects, the behavioral processor 130 receives shower data from the smart shower sensor 102, the user device 104, and/or the smart shower processor 126. Using this data, the behavioral processor 130 determines whether a user's recent usage deviates from a baseline usage by, for example, a threshold deviation. In certain aspects, the user's recent usage may correspond to shower data for the current shower and/or shower data within the past week, two weeks, three weeks, four weeks, etc.

In certain illustrative aspects, the behavioral processor 130 determines baseline usage based on an average of the user's prior shower data. Additionally, or alternatively, the behavioral processor 130 determines baseline usage based on an average of other user's shower data. Other statistical methods can be used to compute the baseline usage in addition to the average or as an alternative to the average. In aspects, the threshold deviation may be set to an initial deviation (e.g., one standard deviation), but may also be configurable by a user. For example, a user can configure the threshold deviation to be two standard deviations from the baseline.

As an illustrative example, the behavioral processor 130 compares the user's recent usage to baseline usage. In instances where the user's recent usage deviates from the baseline usage by a threshold deviation (e.g., one standard deviation), the behavioral processor 130 can provide a behavioral notification to the user device 104. In illustrative aspects, these behavioral notifications can be indicative of a pattern change, fall injury, erratic behavior change, etc. Additionally, or alternatively, the behavioral processor 130 can provide a behavioral notification to an associate of the user (e.g., a family member, a friend, a medical professional, etc.). In illustrative aspects, the behavioral notification provides information about the threshold deviation, such as whether the recent temperature has deviated from the baseline temperature, the recent duration has deviated from the baseline duration, and/or the recent water usage has deviated from the baseline water usage. In certain aspects, the notification can include a graph of the baseline usage and how the recent usage deviates from the baseline usage.

FIG. 13 illustrates an overview of another example system 150 for a smart shower. As illustrated, the system 150 includes smart shower sensor 102, user device 104 (e.g., a mobile device or smartphone), one or more IoT devices 108, and/or smart shower platform 110. As illustrated, the smart shower sensor 102 can be inserted between water source 109, in the form of a shower arm 152, and a conventional showerhead 154 which may be similar to the showerhead 111 of FIG. 1A. Further, as illustrated, the smart shower platform 110 may be able to connect to one or more IoT devices, such as Philips Hue, Bosch IoT devices 108, GE Appliances, and/or Samsung Smart Things in order to provide one or more of the notifications described above (e.g., temperature notifications, duration notifications, and/or usage notifications). Additionally, or alternatively, the smart shower platform 110 may be able to connect to a search engine, such as Google's G-Assistant or Amazon's Alexa to facilitate providing one or more of the notifications described above (e.g., temperature notifications, duration notifications, and/or usage notifications).

Figure 14:
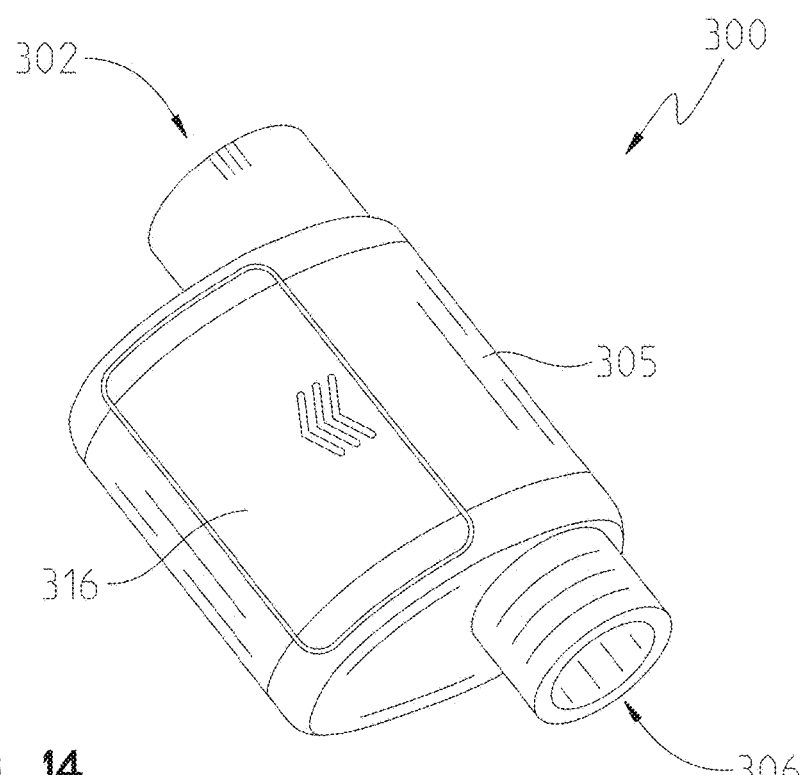
FIG. 14 is a first perspective view of an example smart shower sensor.
Figure 15:
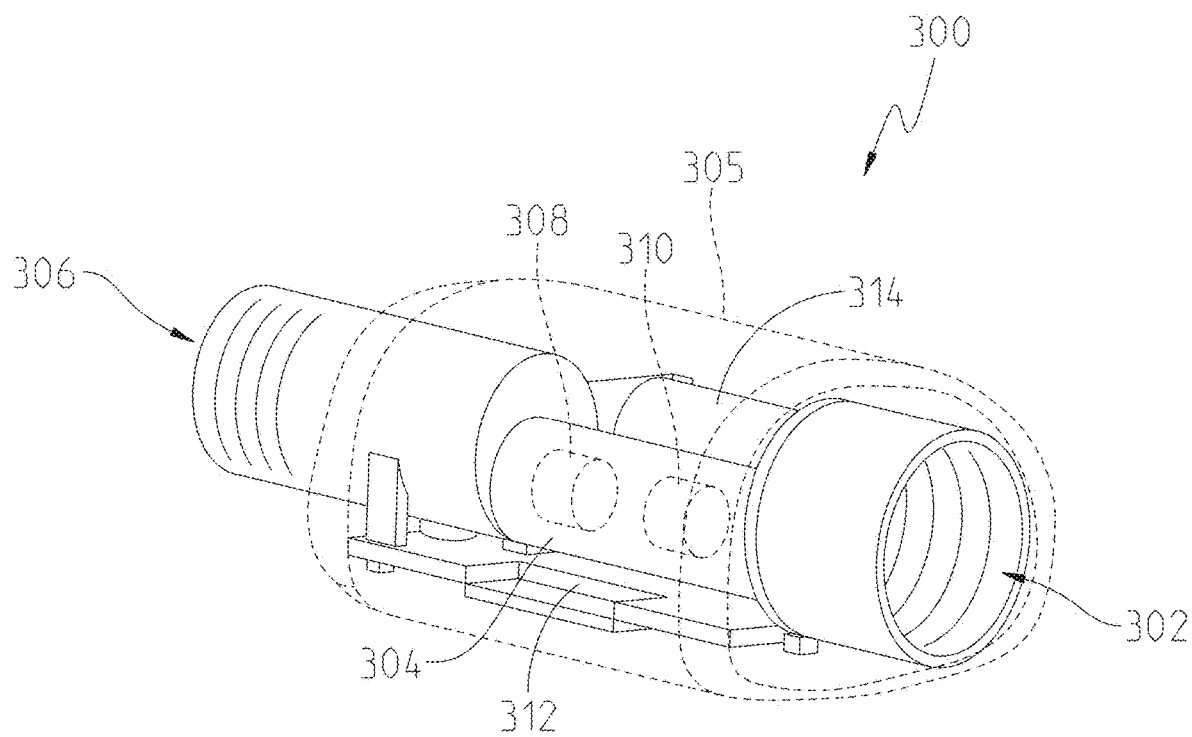
FIG. 15 is a second perspective view of the smart shower sensor of FIG. 14, with the outer housing shown in phantom.

FIGS. 14 and 15 are perspective views of an exemplary smart shower sensor 300, which may be similar to the smart shower sensor 102 as shown in FIG. 1A. However, these diagrams are merely examples, which should not unduly limit the scope of the claims. One of ordinary skill in the art would recognize many variations, alternatives, and modifications.

As illustrated, the smart shower sensor 300 includes an inlet 302. The inlet 302 is configured to be coupled to a water source and receive water from the water source 109. In aspects, the inlet 302 is threadably coupled to the water source 109 (for example, shower arm 152). In illustrative embodiments, water from the water source passes through a conduit 304 of the smart shower sensor 300 and exits through an outlet 306. In certain aspects, different types of showerheads 154 having a variety of different sprayers and/or jets may be fluidly coupled to the outlet 306. Alternatively, water exiting the outlet 306 may be directly sprayed on a user.

In illustrative aspects, the conduit 304 may include one or more temperature sensors 308 to sense the temperature of the water flowing through the smart shower sensor 300. In certain aspects, the temperature sensor 308 may be or be similar to the temperature sensor 112. Additionally, or alternatively, the conduit 304 may include one or more flow sensors 310 to sense whether water is flowing through the smart shower sensor 300 and/or how much water is flowing through the smart shower sensor 300. Similarly, in certain illustrative aspects, the flow sensor 310 may be, or be similar to, the flow sensor 114.

According to certain illustrative aspects, a temperature signal from the temperature sensor 308 and/or a flow signal from the flow sensor 310 may be received by a circuit board 312. In examples, the circuit board 312 includes one or more processors (e.g., processor 118), memory (e.g., memory 120), and/or a transmitter/receiver (e.g., transmitter/receiver 122). In certain illustrative aspects, the circuit board 312, via the one or more processors 118, memory 120, and/or transmitter/receiver 122 may enable the smart shower sensor 200 to perform the same or similar functions as the smart shower sensor 102 depicted in FIG. 1.

In illustrative aspects, the smart shower sensor 300 includes a power supply 314 to power the temperature sensor 308, the flow sensor 310, and/or the circuit board 312. In some illustrative examples, the power supply 314 is removable and/or replaceable by opening a removing a cover 316 to access the power supply 314. In some illustrative embodiments, the power supply 314 is a battery that may or may not be rechargeable. Additionally, or alternatively, the smart shower sensor 300 may be hard wired to an electrical source.

Figure 16:
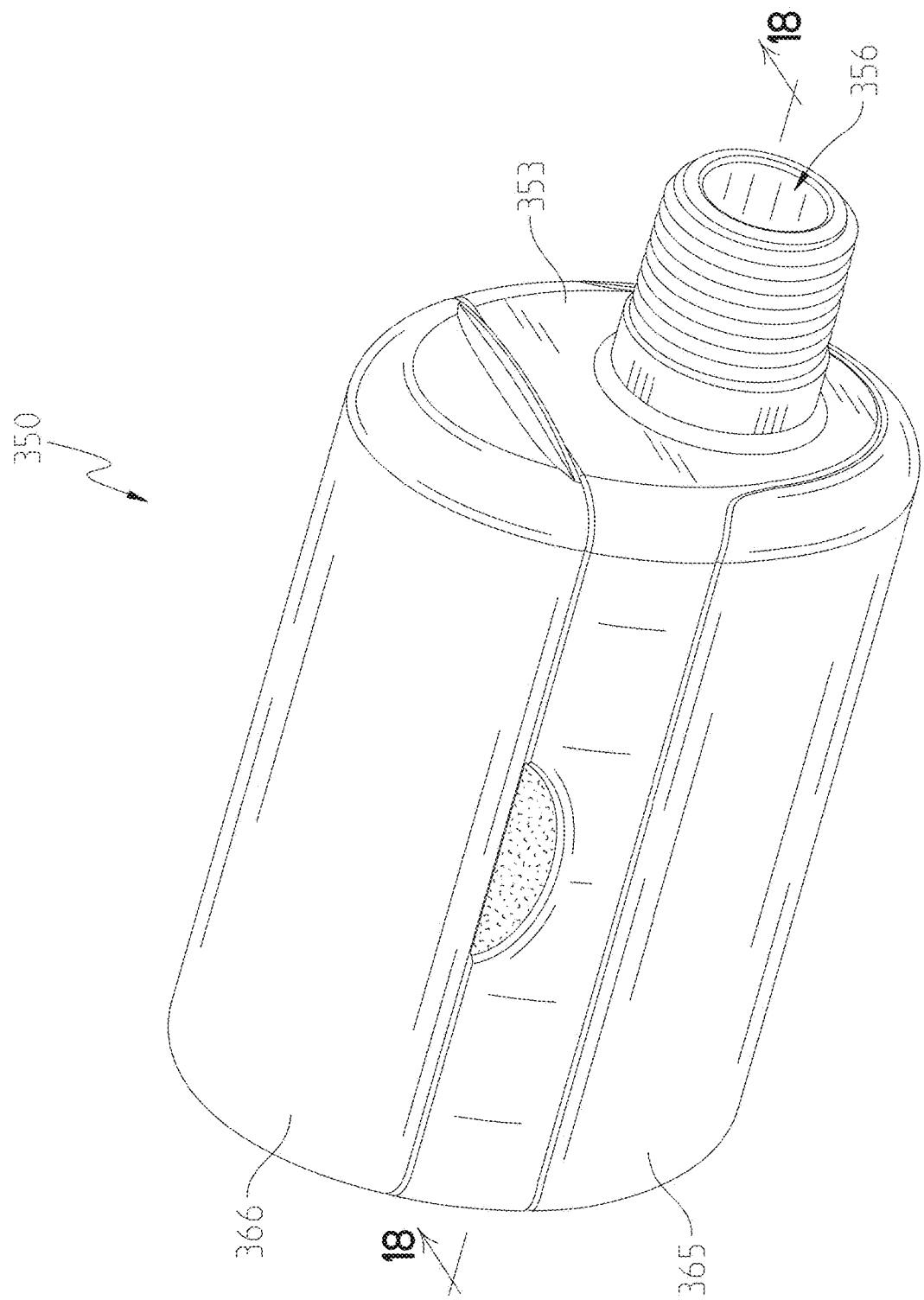
FIG. 16 is a perspective view of a further illustrative smart shower sensor.
Figure 17:
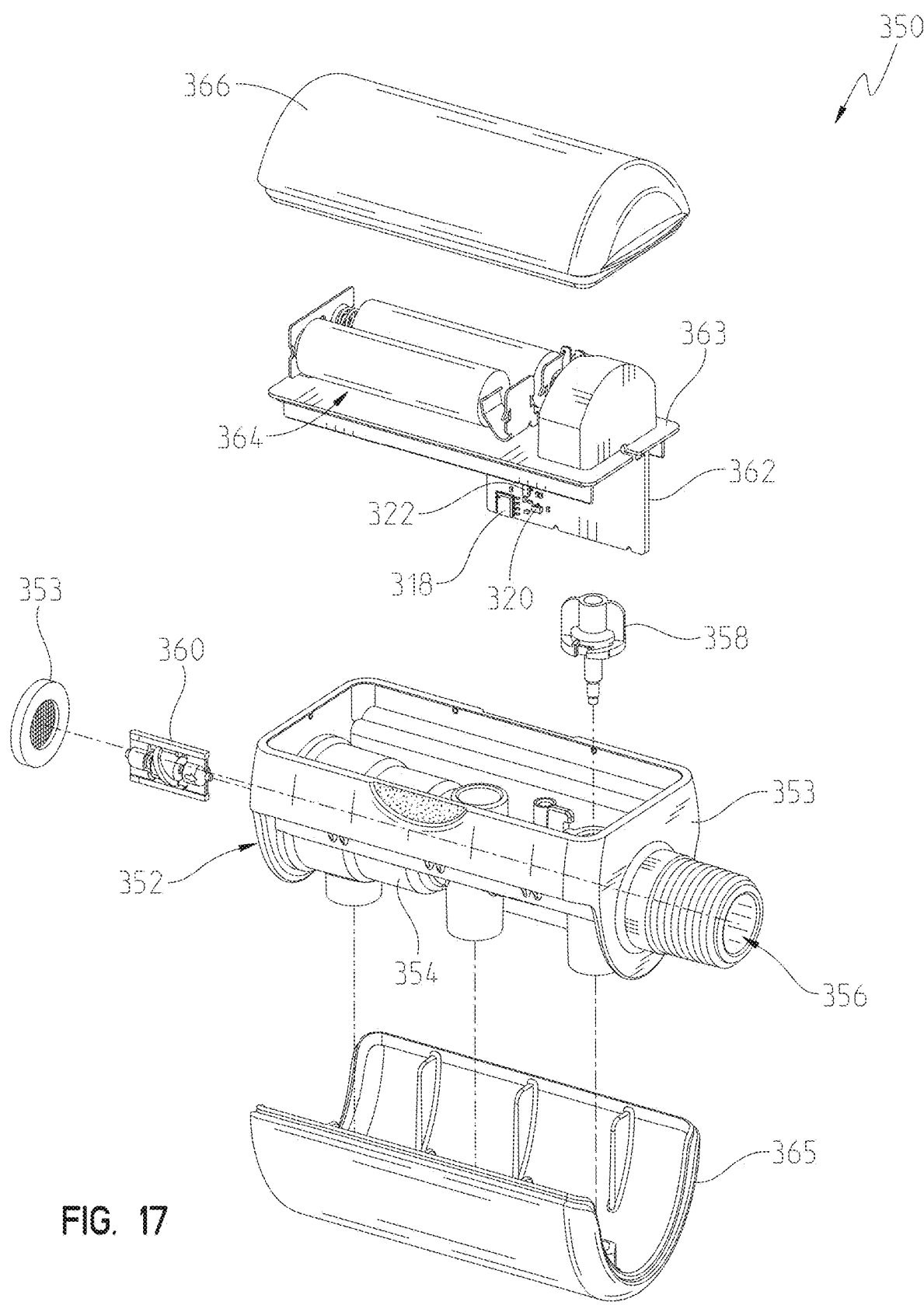
FIG. 17 is an exploded perspective view of the smart shower sensor of FIG. 16.
Figure 18:
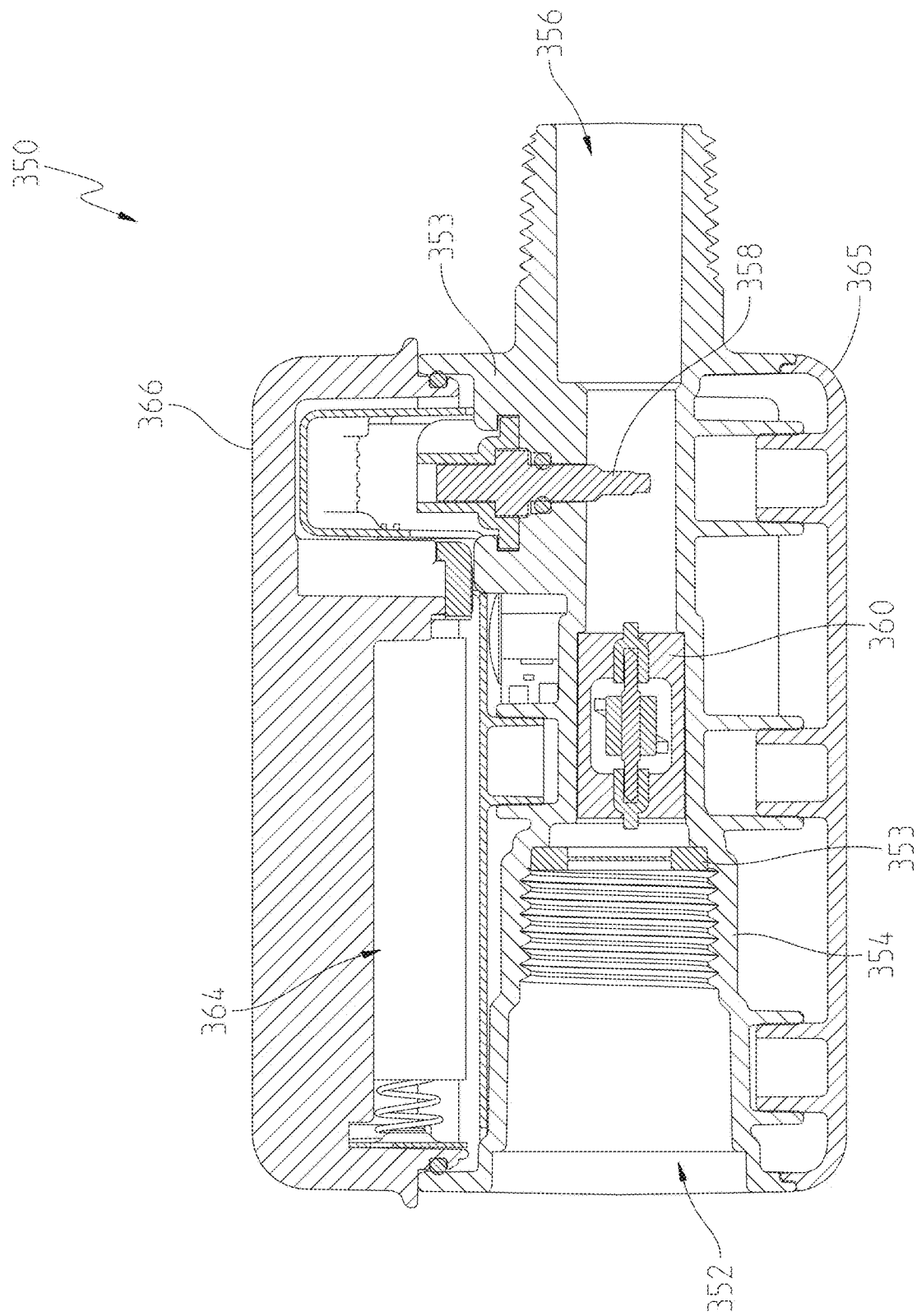
FIG. 18 is a cross-sectional view of the smart shower sensor taken along line 18-18 of FIG. 16.

FIGS. 16-18 illustrate a further exemplary smart shower sensor 350 which may be similar to the smart shower sensor 102 as shown in FIG. 1A. As illustrated, the smart shower sensor 350 includes an inlet 352. The inlet 352 is configured to be coupled to a water source, such as shower arm 152, and receive water from the water source. In certain illustrative embodiments, the inlet 352 includes internal threads 353 (FIG. 18) threadably coupled to external threads (not shown) of the shower arm 152. A flow restrictor or limiter 355 may be fluidly coupled to the inlet 352 downstream from the internal threads 353. Illustratively, water from the water source 109 (e.g., shower arm 152) passes through a conduit 354 of the smart shower sensor 350 and exits through an outlet 356. In certain illustrative embodiments, different types of shower heads 154 having a variety of different sprayers and/or jets may be fluidly coupled to the outlet 356. Illustratively, the outlet 356 includes external threads 357 to facilitate such coupling to internal threads (not shown) of the shower head 154. Alternatively, water exiting the outlet 356 may be directly sprayed on a user.

Illustratively, the conduit 354 supports a temperature sensor 358, such as a thermistor, configured to sense the temperature of water flowing through the conduit 354. In certain illustrative aspects, the temperature sensor 358 may be similar to the temperature sensor 112. Additionally, the conduit 354 may include one or more flow sensors 360 configured to sense whether water is flowing through the smart shower sensor 350 and/or how much water is flowing the smart shower sensor 350. In an illustrative embodiment, the flow sensor 350 may comprise a rotatable turbine 361 supported by a holder or cage 363. Similarly, in certain illustrative aspects, the flow sensor 350 may be, or be similar to, the flow sensor 114.

According to certain illustrative embodiments, a temperature signal from the temperature sensor 358 and/or a flow signal from the flow sensor 360 may be received by a circuit board 362. Illustratively, the circuit board 362 includes one or more processors (e.g., processor 118), memory (memory 120) and/or a transmitter/receiver (e.g., transmitter/receiver 122). In certain illustrative embodiments, the circuit board 362, via the one or more processors, memory, and/or transmitter/receiver may control the smart shower sensor 350 to perform the same or similar functions as the smart shower sensor 102 of FIG. 1.

Illustratively, the smart shower sensor 350 includes a power supply 364 to power the temperature sensor 358, the flow sensor 360, and/or the circuit board 362. Illustratively, the power supply 364 is defined for removal and/or replacement by opening an upper cover 366 removably supported by a body 367. A lower cover 368 is likewise removably supported by the body 367. In some illustrative embodiments, the power supply 364 is a battery 365 that may or may not be rechargeable. Additionally, or alternatively, the smart shower sensor 350 may be hard wired to an electrical supply.

Figure 19:
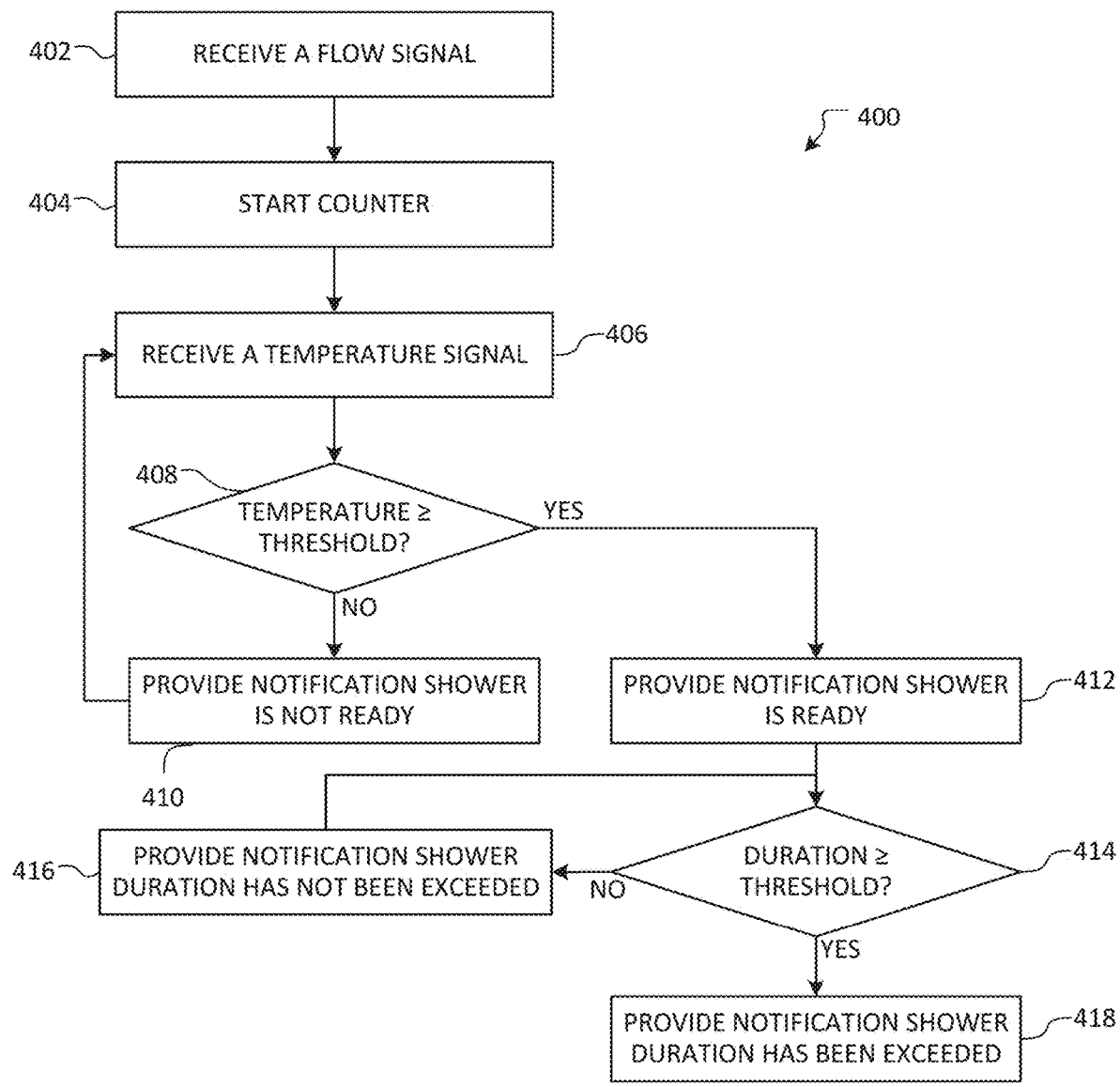
FIG. 19 illustrates a flow diagram of an example method for using a smart shower system.

FIG. 19 illustrates a flow diagram of an example method 400 for using a smart shower sensor, such as the smart shower sensor 102, 300 and/or 350. However, this diagram is merely an example, which should not unduly limit the scope of the claims. One of ordinary skill in the art would recognize many variations, alternatives, and modifications.

Aspects of the method 400 may be performed by the smart shower sensor 102, the user device 104, and/or components thereof. In illustrative embodiments, the method 400 includes receiving a flow signal (block 402). In certain illustrative embodiments, a processor (e.g., processor 118) receives the flow signal from a flow sensor (e.g., the flow sensor 114, the flow sensor 210, and/or the flow sensor 360). Once a flow signal is received, the method 400 may include starting a counter (block 404), which can be used to determine a duration of the shower (i.e., active water flow).

The method 400 also include receiving a temperature signal (block 406). In certain illustrative embodiments, a processor (e.g., processor 118) receives the temperature signal from a temperature sensor (e.g., the temperature sensor 112, the temperature sensor 208, and/or the temperature sensor 358). In certain illustrative embodiments, the method 400 includes determining whether the temperature of the shower, based on the temperature signal, is greater than or equal to a temperature threshold or setpoint (block 408). In certain illustrative instances, the temperature threshold may have some or all of the same characteristics as the temperature threshold discussed above in relation to FIG. 1. For example, the temperature threshold may be configurable by a user.

In instances where the temperature is less than the temperature threshold, the method 400 may include providing a notification the shower system 100 is not ready (block 410) and then the method 400 may proceed back to block 406. In certain illustrative instances, the notification that the shower system 100 is not ready may have some or all of the same characteristics as the notification(s) discussed above in relation to FIG. 1A. For example, the notification the shower system 100 is not ready can be provided by the smart shower sensor 102 (e.g., the indicator 116), the showerhead 111 (e.g., the indicator 113), the user device 104, and/or an IoT device 108. Alternatively, for instances where the temperature is greater than or equal to the temperature threshold, the method 400 may include providing a notification the shower system 100 is ready (block 412). In certain illustrative instances, the notification that the shower system 100 is ready may have some or all of the same characteristics as the notification(s) discussed above in relation to FIG. 1A. For example, the notification the shower system 100 is ready can be provided by the smart shower sensor 102 (e.g., the indicator 116), the showerhead 111 (e.g., the indicator 113), the user device 104, and/or an IoT device 108. In certain illustrative embodiments, once a specified temperature and/or temperature threshold is met, the smart shower sensor 102 may reduce the water that flows through the smart shower sensor 102 until a user enters the shower to conserve water. Additionally, or alternatively, once a specified temperature and/or temperature threshold is met and/or when a user enters the shower, the smart shower sensor 102 may provide one or more types of therapies including, for example, aroma therapy, hydrotherapy, acoustic therapy, and/or the like.

In illustrative embodiments, the method 400 includes determining whether a duration is greater than or equal to a duration threshold (block 414). The duration of the shower may be determined using the count of the counter (block 404). In certain instances, the duration threshold may have some or all of the same characteristics as the duration threshold discussed above in relation to FIG. 1A. For example, the duration threshold may be configurable by a user.

When the duration is not greater than or equal to a duration threshold, the method 400 includes providing a notification the shower duration has not been exceeded (block 416), and then the method 400 may proceed back to block 414 to check again whether the duration meets or exceeds the duration threshold. Conversely, for instances where the duration is greater than or equal to the duration threshold, the method 400 may include providing a notification the shower duration has been exceeded (block 412). In certain instances, the notification that the shower duration has been exceeded may have some or all of the same characteristics as the notification(s) discussed above in relation to FIG. 1A. For example, the notification the shower duration has been exceeded can be provided by the smart shower sensor 102 (e.g., the indicator 116), the showerhead 111 (e.g., the indicator 113), the user device 104, and/or an IoT device 108.

Figure 20:
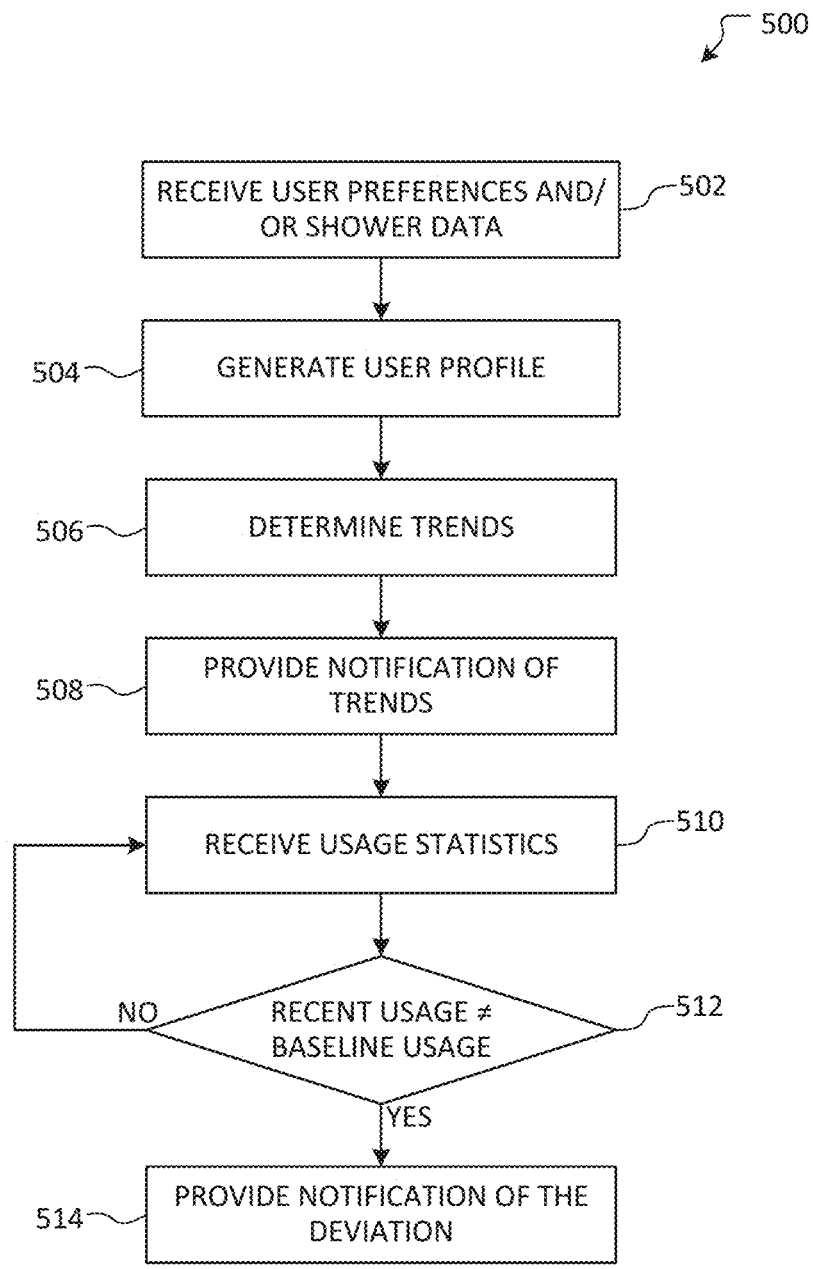
FIG. 20 illustrates a flow diagram of an example method for generating a smart shower user profile.

FIG. 20 illustrates a flow diagram of an example method for generating a smart shower user profile. However, this diagram is merely an example, which should not unduly limit the scope of the claims. One of ordinary skill in the art would recognize many variations, alternatives, and modifications.

In illustrative aspects, the method 500 includes receiving user preferences and/or shower data (block 502). The user preferences may include temperature thresholds, duration thresholds, and/or usage thresholds. The shower data may include water temperatures during showers, durations of showers, and/or water usages for showers. In certain embodiments, a processor (e.g., processor 118) receives the user preferences and/or shower data from smart shower sensor (e.g., smart shower sensor 102, 200), a user device (e.g., user device 104), and/or a smart shower platform (e.g., smart shower platform 110).

Based on the shower data, the method 500 may include generating a user profile for a user (block 504). In certain instances, generating a user profile may include linking the temperature thresholds, duration thresholds, and/or usage thresholds to the user profile. Additionally, or alternatively, the method 500 may include determining trends for the user (block 506). The trends may have some or all of the same characteristics as the trends discussed above in relation to FIG. 1A. For example, the trends may be determined using linear regression or non-linear regression techniques.

In illustrative aspects, the method 500 includes providing notification of the trends (block 508). The notifications of the trends may be the same or similar as the trend notifications described above in relation to FIG. 1A. For example, the trend notifications can include a graph of the user trends.

In certain illustrative aspects, the method 500 includes receiving usage statistics (block 510). The usage statistics can have the same or similar characteristics as the usage data described above in relation to FIG. 1A. For example, a baseline usage may be determined from the usage statistics and/or recent usage may be determined from the usage statistics. In certain aspects, the user's recent usage may correspond to shower data for the current shower and/or shower data within the past week, two weeks, three weeks, four weeks, etc.

The method 500 may include determining whether the recent usage deviates from a baseline usage by, for example, a threshold deviation (block 512). In aspects, the threshold deviation can have the same or similar characteristics as the threshold deviation described above in relation to FIG. 1A. For example, a user can configure the threshold deviation.

In instances where the recent usage does not deviate from a baseline usage by a deviation threshold, the method 500 may return to block 510 to receive more usage statistics. Alternatively, in instances where the recent usage deviates from the baseline usage by at least a deviation threshold, the method 500 may include providing a notification of a deviation (block 514). In certain embodiments, the notification of the deviation may be the same or similar to the notification for the deviation described above in relation to FIG. 1A. For example, the notification can be provided to a user device (e.g., user device 104) and a user device of an associate of the user.

Figure 21:
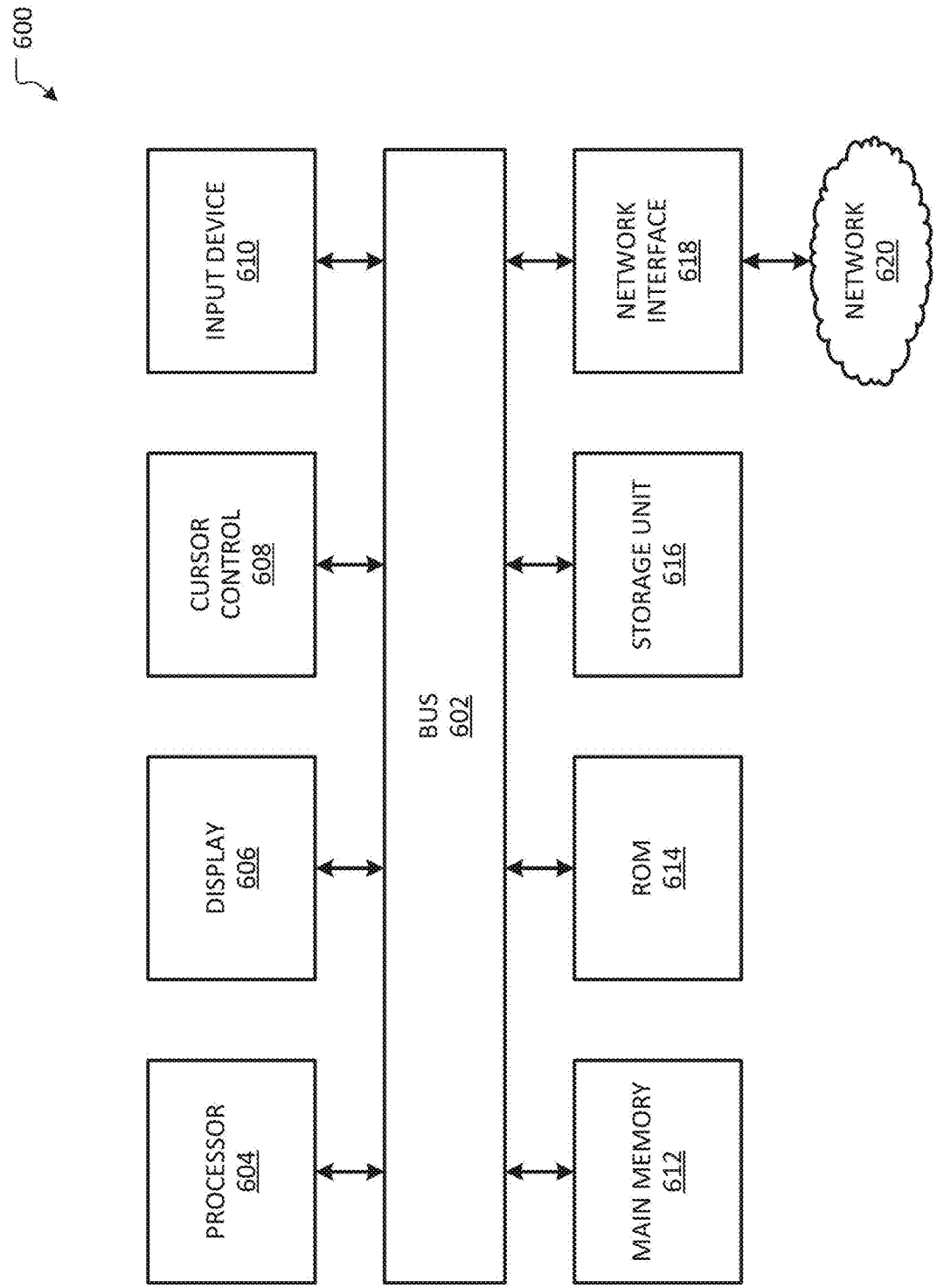
FIG. 21 illustrates a diagram of a computing system for implementing a smart shower system.

FIG. 21 illustrates a diagram of a computing system 600 for implementing a smart shower. For example, some or all of the functions of smart shower sensor 102, user device 104, smart shower platform 110, and/or smart shower sensor 200 may be performed by a computing system that has similar components as the computing system 600. This diagram is merely an example, which should not unduly limit the scope of the claims. One of ordinary skill in the art would recognize many variations, alternatives, and modifications.

The computing system 600 illustratively includes a bus 602 or other communication mechanism for communicating information between, a processor 604, a display 606, a cursor control component 608, an input device 610, a main memory 612, a read only memory (ROM) 614, a storage unit 616, and/or a network interface 618. In some examples, the bus 602 is coupled to the processor 604, the display 606, the cursor control component 608, the input device 610, the main memory 612, the read only memory (ROM) 614, the storage unit 616, and/or the network interface 618. And, in certain examples, the network interface 618 is coupled to a network 620 (e.g., the network 106).

In some illustrative examples, the processor 604 includes one or more general purpose microprocessors. In some examples, the main memory 612 (e.g., random access memory (RAM), cache and/or other dynamic storage devices) is configured to store information and instructions to be executed by the processor 604. In certain examples, the main memory 612 is configured to store temporary variables or other intermediate information during execution of instructions to be executed by processor 604. For example, the instructions, when stored in the storage unit 616 accessible to processor 604, render the computing system 600 into a special-purpose machine that is customized to perform the operations specified in the instructions (e.g., the components 126-134 and/or methods 300, 400). In some examples, the ROM 614 is configured to store static information and instructions for the processor 604. In certain examples, the storage unit 616 (e.g., a magnetic disk, optical disk, or flash drive) is configured to store information and instructions.

Thus, computing system 600 may include at least some form of computer readable media. The computer readable media may be any available media that can be accessed by processor 604 or other devices. For example, the computer readable media may include computer storage media and communication media. The computer storage media may include volatile and nonvolatile, removable and non-removable media implemented in any method or technology for storage of information such as computer readable instructions, data structures, program modules or other data. The computer storage media may not include communication media.

In some illustrative embodiments, the display 606 (e.g., a cathode ray tube (CRT), an LCD display, or a touch screen) is configured to display information to a user of the computing system 600. In some examples, the input device 610 (e.g., alphanumeric and other keys) is configured to communicate information and commands to the processor 604. For example, the cursor control 608 (e.g., a mouse, a trackball, or cursor direction keys) is configured to communicate additional information and commands (e.g., to control cursor movements on the display 606) to the processor 604.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A smart shower sensor comprising:
   an inlet receiver configured to couple to a water source and receive water from the water source;
   a conduit fluidly coupled to the inlet receiver and configured to receive the water from the inlet receiver;
   a temperature sensor configured to sense a temperature of the water in the conduit;
   an indicator configured to emit a notification of the temperature and a duration of the water flowing through the conduit;
   a processor configured to:
      receive, from a temperature sensor, a temperature signal corresponding to the temperature;
      determine the duration; and
      send, to the indicator, a notification signal corresponding to the temperature signal and a duration signal corresponding to the duration, wherein the indicator emits a notification of the temperature and the duration in response to receiving the notification signal; and
   the processor includes a behavioral processor configured to determine baseline usage based on an average of prior flow signals, determine usage deviation from the baseline usage, and provide a behavioral notification to the user device based upon the usage deviation exceeding by a threshold deviation.

2. The smart shower sensor of claim 1, further comprising:
   a transmitter configured to transmit a temperature notification corresponding to the temperature and a duration notification corresponding to the duration; and
   wherein the processor is further configured to transmit to a computing device, via the transmitter, the temperature notification and the duration notification.

3. The smart shower sensor of claim 2, further comprising:
   a flow sensor configured to sense a flow of the water through the conduit; and
   wherein the processor is further configured to:
      receive a flow signal corresponding to the flow of the water; and
      transmit, via the transmitter to the computing device, the flow signal.

4. The smart shower sensor of claim 1, wherein the processor is further configured to:
   determine the temperature of the water exceeds a temperature threshold; and
   wherein the notification signal comprises a burn alert indicating the temperature of the water exceeds the temperature threshold.

5. The smart shower sensor of claim 1, wherein the processor is further configured to:
   determine the duration of the shower exceeds a duration threshold; and
   wherein the notification signal comprises a conservation alert indicating the duration of the shower exceeds the duration threshold.

6. The smart shower sensor of claim 1, wherein the notification is an olfactory notification.

7. The smart shower sensor of claim 1, wherein the indicator comprises an Internet of Things (IoT) device in wireless communication with the processor and the notification is a visual notification, an auditory notification, and/or an olfactory notification.

8. The smart shower sensor of claim 7, wherein the Internet of Things (IoT) device comprises a smart light source configured to provide a visual notification of different light colors over a duration of water flow through the conduit.

9. The smart shower sensor of claim 6, further comprising:
a memory in communication with the processor; and
a plurality of presets stored in the memory, each preset defining properties of the notification.

10. The smart shower sensor of claim 9, wherein:
the plurality of presets are accessible on a user interface of a mobile user device; and
each preset is configured to associate the temperature and the duration with properties of the notification.

11. The smart shower sensor of claim 1, further comprising:
an outlet fluidly coupled to the conduit;
a conventional showerhead threadably coupled to the outlet;
wherein the inlet receiver is threadably coupled to a shower arm which conveys water from a conventional manual mixing valve and the discharge of water from the conventional showerhead is controlled solely by the conventional manual mixing valve.

12. The smart shower sensor of claim 11, further comprising:
a housing receiving the conduit;
a battery compartment supported by the housing; and
a cover removably supported by the housing to enclose the battery compartment.

13. A smart shower sensor system comprising:
an inlet receiver configured to couple to a conventional manual mixing valve and receive water from the conventional manual mixing valve;
a conduit fluidly coupled to the inlet receiver and configured to receive the water from the inlet receiver;
an outlet fluidly coupled to the conduit;
a conventional showerhead threadably coupled to the outlet wherein the discharge of water from the conventional showerhead is controlled solely by the conventional manual mixing valve;
a temperature sensor configured to sense a temperature of the water in the conduit;
a flow sensor configured to sense a flow of the water through the conduit;
an indicator configured to emit a notification of at least one of the temperature and the flow of the water flowing through the conduit;
a processor configured to:
receive, from the temperature sensor, a temperature signal corresponding to the temperature;
receive, from the flow sensor, a flow signal corresponding to the flow of the water; and
send to the indicator, a notification signal corresponding to at least one of the temperature signal and the flow signal, wherein the indicator emits a notification of at least one of the temperature and the flow in response to receiving the notification signal;
wherein the notification is at least one of a visual notification, an auditory notification, and an olfactory notification; and
wherein the indicator comprises an Internet of Things (IoT) device in wireless communication with the processor.

14. The smart shower sensor system of claim 13, wherein the indicator is configured to emit a notification of the temperature and a duration of the water flowing through the conduit.

15. The smart shower sensor system of claim 14, further comprising:
a transmitter configured to transmit a temperature notification corresponding to the temperature and a duration notification corresponding to the duration; and
wherein the processor is further configured to transmit to a computing device, via the transmitter, the temperature notification and the duration notification.

16. The smart shower sensor system of claim 14, wherein the processor is further configured to:
determine the duration of the shower exceeds a duration threshold; and
wherein the notification signal comprises a conservation alert indicating the duration of the shower exceeds the duration threshold.

17. The smart shower sensor system of claim 13, wherein the processor is further configured to:
determine the temperature of the water exceeds a temperature threshold; and
wherein the notification signal comprises a burn alert indicating the temperature of the water exceeds the temperature threshold.

18. The smart shower sensor system of claim 13,
wherein the inlet receiver is threadably coupled to a shower arm.

19. The smart shower sensor system of claim 18, further comprising:
a housing receiving the conduit;
a battery compartment supported by the housing; and
a cover removably supported by the housing to enclose the battery compartment.

20. The smart shower sensor system of claim 13, wherein the Internet of Things (IoT) device comprises a smart light source configured to provide a visual notification of different light colors over a duration of water flow through the conduit.

21. The smart shower sensor system of claim 20, further comprising:
a memory in communication with the processor; and
a plurality of presets stored in the memory, each preset defining properties of the notification.

22. The smart shower sensor system of claim 21, wherein:
the plurality of presets are accessible on a user interface of a mobile user device; and
each preset is configured to associate the temperature and the flow with properties of the notification.

23. A shower system comprising:
a smart shower sensor including a conduit, a temperature sensor configured to sense a temperature of water in the conduit, and a flow sensor configured to sense a flow of water through the conduit;
a smart shower platform in wireless communication with the smart shower sensor via a communication network, the smart shower platform including a processor and a memory in communication with the processor; and
a user device in wireless communication with the smart shower platform via the communication network;

wherein the processor is configured to:
receive, from the temperature sensor, a temperature signal corresponding to the temperature;
receive, from the flow sensor, a flow signal corresponding to the flow of the water;
send to the user device, a notification signal corresponding to at least one of the temperature signal and the flow signal, wherein the user device displays a notification of at least one of the temperature and the flow in response to receiving the notification signal; and
the processor includes a behavioral processor configured to determine baseline usage based on an average of prior flow signals, determine usage deviation from the baseline usage, and provide a behavioral notification to the user device based upon the usage deviation exceeding by a threshold deviation.

24. The shower system of claim 23, wherein the processor includes a usage tracker configured to track temperature signals and flow signals, and provide a trend notification to the user device of at least one of temperature, duration and water usage over time.

25. The shower system of claim 23, wherein the smart shower sensor is adapted to be connected between a conventional manual mixing valve and a conventional showerhead and the discharge of water from the conventional showerhead is controlled solely by the conventional manual mixing valve.

26. The shower system of claim 23, further comprising an output device in wireless communication with the smart shower platform via the communication network, the output device configured to provide at least one of sound and light in response to at least one of the temperature signal and the flow signal.

27. The shower system of claim 26, wherein the output device includes a speaker and a light source, the sound and the light determined based upon a user preset stored in memory.

28. The shower system of claim 23, further comprising a plurality of presets stored in the memory, each preset defining properties of the notification.

29. The shower system of claim 28, wherein:
the plurality of presets are accessible on a user interface of the user device; and
each preset is configured to associate the temperature and the flow with properties of the notification.

* * * * *